(12) United States Patent
Bates et al.

(10) Patent No.: US 6,874,122 B1
(45) Date of Patent: Mar. 29, 2005

(54) COMPUTER SYSTEM, PROGRAM PRODUCT AND METHOD OF ADJUSTING THE DISPLAY POSITIONS OF HYPERTEXT LINKS TO MODIFY THE RELATIVE ALIGNMENT THEREOF

(75) Inventors: Cary Lee Bates, Rochester, MN (US); Paul Reuben Day, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 1212 days.

(21) Appl. No.: 09/007,493

(22) Filed: Jan. 15, 1998

(51) Int. Cl.[7] .............................................. G06F 17/00
(52) U.S. Cl. ...................................... 715/526; 715/520
(58) Field of Search ................................ 707/501, 513, 707/517, 531; 715/520, 526

(56) References Cited

U.S. PATENT DOCUMENTS

| | | | | |
|---|---|---|---|---|
| 4,860,378 A | * | 8/1989 | Aoki et al. ..................... | 382/61 |
| 5,553,217 A | * | 9/1996 | Hart et al. .................... | 707/521 |
| 5,649,216 A | * | 7/1997 | Sieber ......................... | 395/767 |
| 5,689,717 A | * | 11/1997 | Pritt ........................... | 395/773 |
| 5,696,918 A | * | 12/1997 | Barker et al. ................ | 395/348 |
| 5,724,498 A | * | 3/1998 | Nussbaum .................... | 395/171 |
| 5,765,874 A | * | 6/1998 | Chanenson et al. ........... | 283/67 |
| 5,802,533 A | * | 9/1998 | Walker ........................ | 707/529 |
| 5,987,482 A | * | 11/1999 | Bates et al. .................. | 707/513 |
| 6,016,147 A | * | 1/2000 | Gantt .......................... | 345/420 |
| 6,023,714 A | * | 2/2000 | Hill et al. .................... | 707/513 |
| 6,075,537 A | * | 6/2000 | Adapathya et al. .......... | 345/357 |
| 6,088,708 A | * | 7/2000 | Burch et al. ................. | 707/509 |

OTHER PUBLICATIONS

Holzner, Steven, Java 1.1: No experience required., Sybex, pp. 11–12, Dec. 1997.*
Oliver, Dick, et al, Netscape 3 Unleashed, second edition, Sams.net Publishing, pp. xxxi, 5, 348, 360–363, 566–567, Dec. 1996.*
Oliver, Dick, et al, Sams' Teach Yourself HTML 4 in 24 Hours, second edition, Sams.net Publishing, pp. 17–19, 61, 68–69, 91, 367, Dec. 1997.*
Peels, Arno J. H. M., et al, "Document Architecture and Text Formatting", ACM Transactions on Office Information Systems, vol. 3, No. 4, pp. 437–369, Oct. 1985.*
Tyler et al, Microsoft FrontPage 98, ISBN 1–57521–372–9, pp. 39–53, 139–166, 359–381, Nov. 1997.*

* cited by examiner

*Primary Examiner*—Sanjiv Shah
(74) *Attorney, Agent, or Firm*—Wood Herron & Evans LLP

(57) ABSTRACT

A computer system, program product and method of displaying documents control the relative alignment of hypertext links by adjusting previously-determined display positions of selected hypertext links in a document. The relative alignment of the hypertext links may be controlled to unalign hypertext links that are in close proximity with one another and eliminate any overlap between the links, which assists in minimizing the inadvertent selection of unintended links. In addition, the relative alignment of the hypertext links may also be controlled to align the hypertext links, which may be useful for aesthetic purposes and/or to minimize pointer movement requirements for a group of related (and aligned) links.

37 Claims, 14 Drawing Sheets

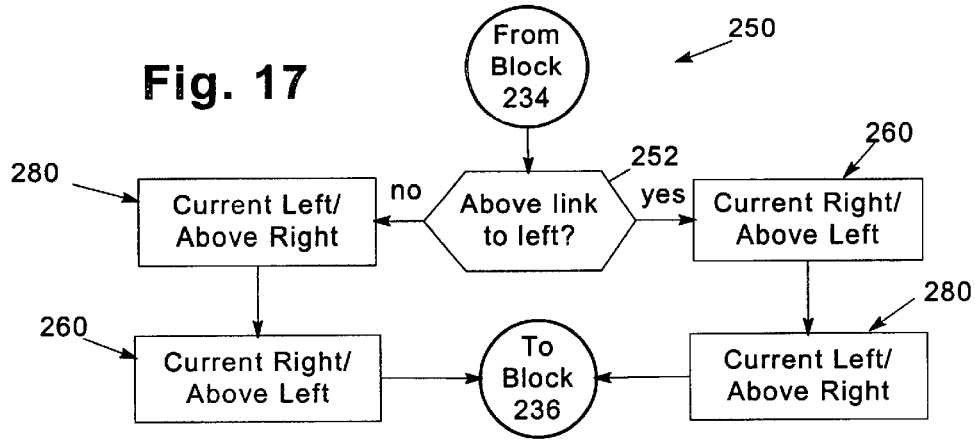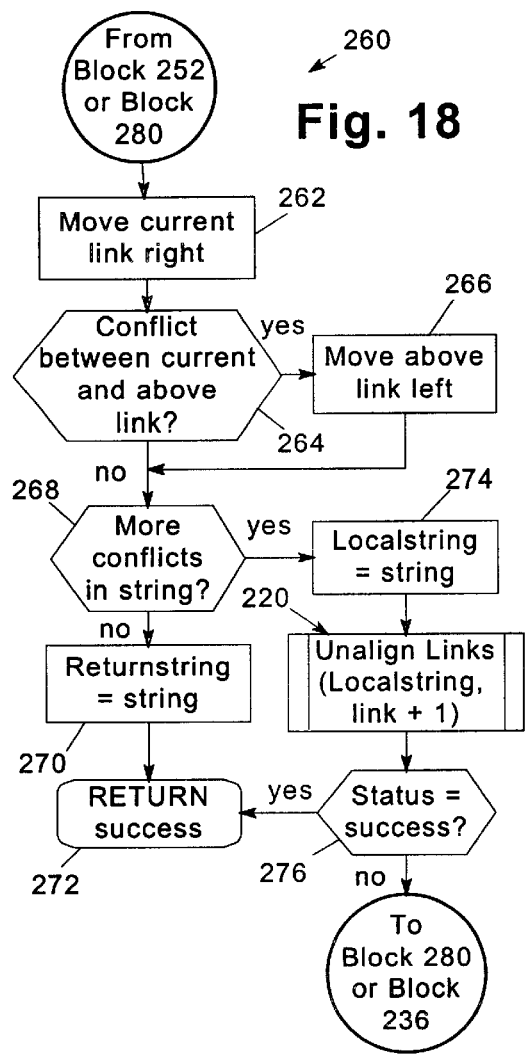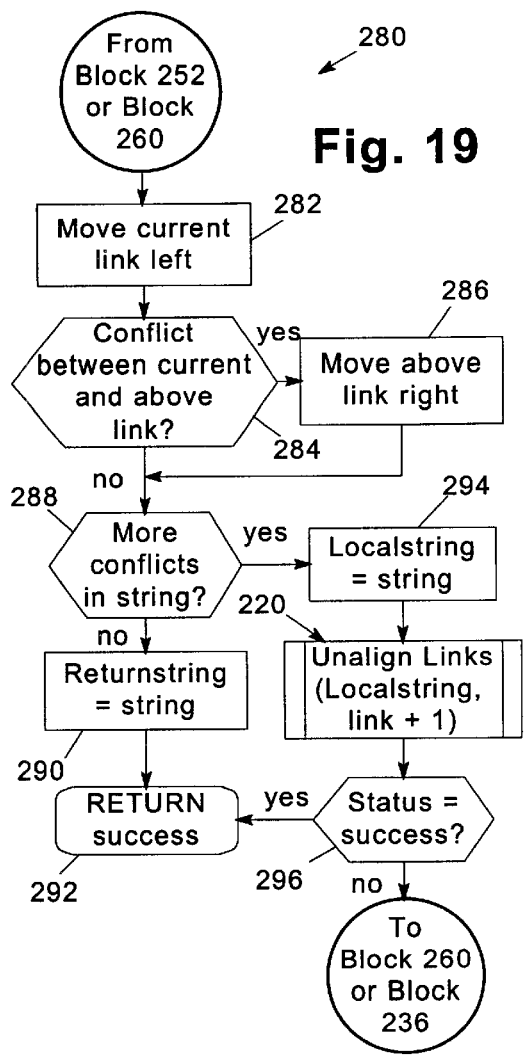
Fig. 17
Fig. 18
Fig. 19

COMPUTER SYSTEM, PROGRAM PRODUCT AND METHOD OF ADJUSTING THE DISPLAY POSITIONS OF HYPERTEXT LINKS TO MODIFY THE RELATIVE ALIGNMENT THEREOF

FIELD OF THE INVENTION

The invention is generally related to computers and computer software. More specifically, the invention is generally related to a manner of displaying the hypertext links on a computer display.

BACKGROUND OF THE INVENTION

Hypertext linking has become an extremely popular manner for interfacing with a computer due to its intuitiveness, simplicity and efficiency. With hypertext linking, a user is permitted to navigate between documents and/or between different locations in the same document simply by moving a pointer over a hypertext link and selecting the hypertext link by depressing a key or button (a process known as "pointing and clicking").

Hypertext links often include text that is embedded within a text string that is highlighted to identify the text as a hypertext link. As such, a user is often able to navigate by directly selecting the text from a portion of a text string. For example, a text string such as "the winner of the 1973 Kentucky Derby was Secretariat" might have a hypertext link defined for the word "Secretariat", such that a user might be able to view a separate document with Secretariat's career racing statistics simply by pointing and clicking on the word "Secretariat".

A principal use of hypertext linking is in retrieving information from the Internet, and specifically, a portion of the Internet known as the World Wide Web ("the Web"). Moreover, due to the ever-increasing popularity of the Web, many private networks, as well as other applications local to a user's workstation, now use hypertext linking to access and navigate between documents. Documents are typically formatted using a standard language known as the Hypertext Markup Language (HTML), and are viewed using a computer software application known as a web or hypertext browser, Browsers typically display all or a portion of a particular document in one or more graphical windows.

One problem associated with hypertext linking is that there has been no manner of controlling the relative alignment of hypertext links displayed in close proximity to one another. With HTML, for example, embedded hypertext links are simply treated as highlighted text within a text string, with the text string automatically wrapped, or split, at the end of each display line. The displayed representations of HTML documents are typically generated (rendered) dynamically, and as a result, the displayed representations, and most notably the display positions of hypertext links, are dependent upon a number of factors, e.g., the type of computer system, the display size and resolution, the dimensions of the window in which a document is displayed, the size, type and attributes of the display fonts for the text string and the hypertext links, etc. Moreover, if any of these factors are changed, the displayed representations may also change. Consequently, it is often impossible to predict and/or control precisely how a number of hypertext links line up relative to one another on a particular user's display.

The inability to precisely control the display positions of hypertext links can create several difficulties for users in different circumstances. For example, one difficulty that has arisen with respect to hypertext linking is that it can become difficult to accurately navigate using hypertext links when multiple links are displayed in close proximity to one another. When the text for hypertext links is relatively small, for example, it is not uncommon for a user to accidently point and click on another hypertext link that is adjacent to the intended link, which often results in navigation to the wrong location. A user may not recognize his or her error, which may result in later confusion for the user. Moreover, even if the user does recognize the error, retrieval of an incorrect document has already been initiated when the error is discovered, which may take several seconds or even minutes to load the document, often wasting a significant amount of a user's time. While a user often has the ability to terminate retrieval of a document, such a step requires separate user input that distracts the user and similarly wastes time. As a result, selection of an unintended hypertext link can be extremely frustrating for many users.

Another difficulty that can arise with respect to hypertext linking is any misalignment of some types of links displayed in close proximity to one another. For example, in certain applications, it may be desirable to group together a number of related hypertext links, e.g., when it is desired to quickly select several hypertext links in sequence. Due to the inability to precisely control the display positions of such links, however, the links may be somewhat misaligned relative to one another. This may produce undesirable aesthetic effects, as well as adversely impact a user's efficiency due to an excessive amount of pointer movement required to select the links.

Many desktop publishing and word processing applications, among others, permit a user to precisely control where text, images and other displayed objects are displayed relative to one another. However, these applications typically create static documents that are rendered in the same manner on all computer systems, and with the same relative orientation of the displayed objects. As a result, such applications typically do not address the need to modify the relative alignment of hypertext links within a dynamically-rendered document where the resulting displayed representation of the document can vary from system to system.

Therefore, a significant need exists for a manner of controlling the relative alignment of hypertext links to one another, and in particular, a manner of controlling the relative alignment of hypertext links in dynamically-rendered documents.

SUMMARY OF THE INVENTION

The invention addresses these and other problems associated with the prior art by providing enhanced control over how hypertext links from a document are displayed relative to one another on a computer display, typically so that any undesirable alignment conditions that might otherwise exist between such hypertext links may be diminished. Consistent with the invention, a computer system, program product and method of displaying documents are provided in which the relative alignment of hypertext links is controlled by adjusting previously-determined display positions of selected hypertext links in a document. The relative alignment of the hypertext links may be controlled to unalign hypertext links that are in close proximity with one another and eliminate any overlap between the links, which assists in minimizing the inadvertent selection of unintended links. In addition to or in lieu of unaligning links, the relative alignment of the hypertext links may also be controlled to align the hypertext links, which may be useful for aesthetic purposes and/or to minimize pointer movement requirements for a group of related (and aligned) links. In either instance, the performance and usability of hypertext links are often improved.

These and other advantages and features, which characterize the invention, are set forth in the claims annexed hereto and forming a further part hereof. However, for a better understanding of the invention, and of the advantages and objectives attained through its use, reference should be made to the Drawing, and to the accompanying descriptive matter, in which there is described exemplary embodiments of the invention.

BRIEF DESCRIPTION OF THE DRAWING

FIG. 17 is a flow chart illustrating the program flow of the handle above link conflict routine of FIG. 16.

FIG. 18 is a flow chart illustrating the program flow of the current right slash above left routine of FIG. 17.

FIG. 19 is a flow chart illustrating the program flow of the current left slash above right routine of FIG. 17.

DETAILED DESCRIPTION

The embodiments described hereinafter may be used to modify the relative alignment of selected hypertext links in a document to improve the aesthetic effect and/or to improve the usability of the hypertext links, typically through controllably aligning or unaligning the hypertext links through adjusting the display positions thereof. In one preferred application, the embodiments are used to modify the relative alignment of hypertext links found within hypertext documents, such as those formatted in HTML and retrievable by a user from the Internet, from a private intranet or other network, or from internal or external storage devices local to a user's workstation. Moreover, as such documents are predominantly viewed using a computer software application known as a web or hypertext browser, it is contemplated that various aspects of the invention may be implemented within such an application. It should be appreciated, however, that the invention should not be limited to the particular embodiments disclosed herein, as the principles of the invention may be utilized in other potential embodiments, e.g., with other computer software applications, and with documents having other formats, among others.

Prior to discussing specific embodiments of the invention, a brief description of exemplary hardware and software environments for use therewith is provided.

Hardware Environment

Figure 1:
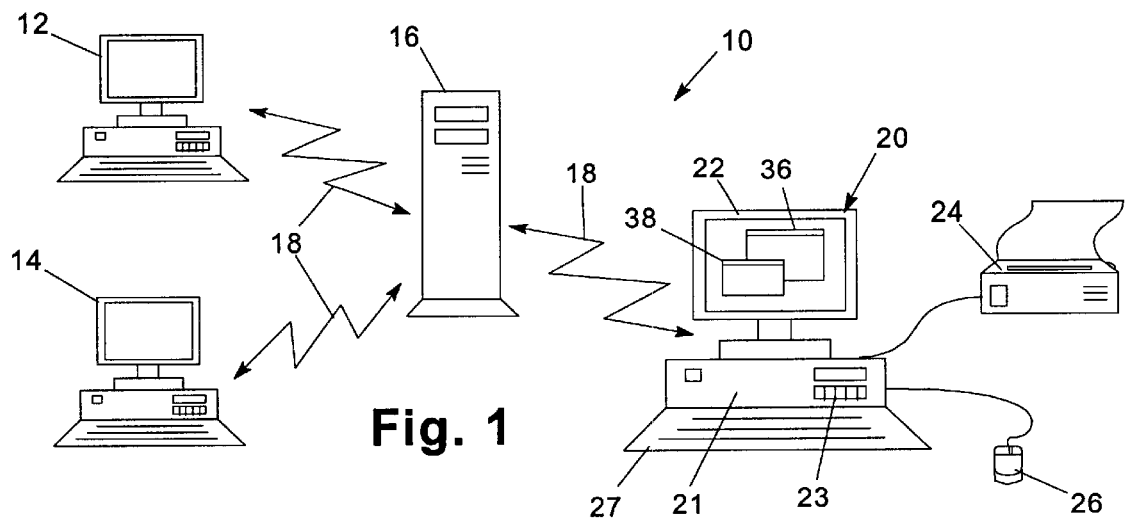
FIG. 1 is a block diagram of a computer system consistent with the invention.

Turning to the Drawing, wherein like numbers denote like parts throughout the several views, a computer system 10 consistent with the invention is illustrated in FIG. 1. Computer system 10 is illustrated as a networked computer system including one or more client computer systems 12, 14 and 20 (e.g., desktop or personal computers, workstations, etc.) coupled to server system 16 through a network 18. Network 18 may represent practically any type of networked interconnection, including but not limited to local-area, wide-area, wireless, and public networks (e.g., the Internet). Moreover, any number of computers and other devices may be networked through network 18, e.g., multiple servers. Furthermore, it should be appreciated that the principles of the invention may be utilized as well by stand-alone computers and associated devices consistent with the invention.

Computer system 20, which may be similar to computer systems 12, 14, may include a processor such as a microprocessor 21; a number of peripheral components such as a computer display 22 (e.g., a CRT, an LCD display or other display device); storage devices 23 such as hard, floppy, and/or CD-ROM disk drives; a printer 24; and various input devices (e.g., a mouse 26 and keyboard 27), among others. Computer system 20 operates under the control of an operating system, and executes various computer software applications, programs, objects, modules, etc. For example, one such computer software application is a hypertext browser, windows 36, 38 of which are displayed on computer display 22. Moreover, various applications, programs, objects, modules, etc. may also execute on one or more processors in server 16 or other computer systems 12, 14, e.g., in a distributed computing environment.

In general, the routines executed to implement the illustrated embodiments of the invention, whether implemented as part of an operating system or a specific application, program, object, module or sequence of instructions will be referred to herein as "computer programs". The computer programs typically comprise instructions which, when read and executed by one or more processors in the devices or systems in networked computer system 10, cause those devices or systems to perform the steps necessary to execute steps or elements embodying the various aspects of the invention. Moreover, while the invention has and hereinafter will be described in the context of fully functioning computer systems, those skilled in the art will appreciate that the various embodiments of the invention are capable of being distributed as a program product in a variety of forms, and that the invention applies equally regardless of the particular type of signal bearing media used to actually carry out the distribution. Examples of signal bearing media include but are not limited to recordable type media such as volatile and non-volatile memory devices, floppy disks, hard disk drives, CD-ROM's, and DVD's, among others and transmission type media such as digital and analog communications links.

Those skilled in the art will recognize that the exemplary environment illustrated in FIG. 1 is not intended to limit the present invention. Indeed, those skilled in the art will recognize that other alternative hardware environments may be used without departing from the scope of the invention.

Software Environment

Figure 2:
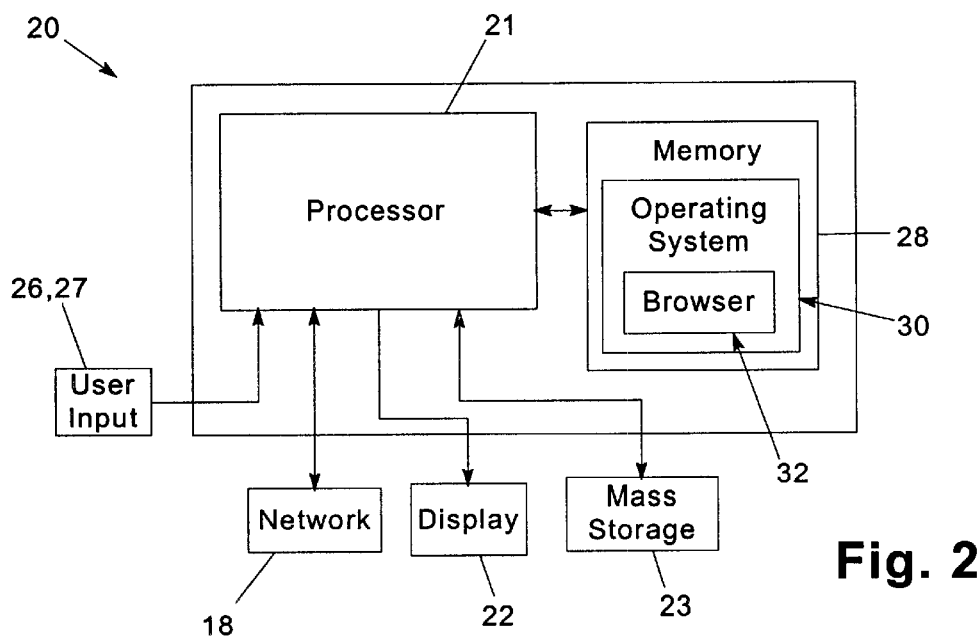
FIG. 2 is a block diagram of an exemplary software environment for the computer system of FIG. 1.

FIG. 2 illustrates one suitable software environment for computer system 20 consistent with the invention. A processor 21 is illustrated as coupled to a memory 28 as well as to several inputs and outputs. For example, user input is received by processor 21, e.g., by mouse 26 and keyboard 27, among others. Additional information may be passed between computer system 20 and other computer systems in networked computer system 10 via network 18. Additional information may be stored to and/or received from mass storage 23. Processor 21 also outputs display data to display 22. It should be appreciated that computer system 20 includes suitable interfaces between processor 21 and each of components 18, 22, 23, 26, 27 and 28 as is well known in the art.

An operating system 30 is illustrated as resident in memory 28, and executing within this operating system is illustrated a hypertext browser 32. However, it should be appreciated that browser 32 may be stored on network 18 or mass storage 23 prior to start-up, and in addition, may have various components that are resident at different times in any of memory 28, mass storage 23, network 18, or within registers and/or caches in processor 21.

Browser 32 processes hypertext documents for viewing. The hypertext documents may be retrieved from mass storage 23 or over network 18, e.g., through an Internet connection. Moreover, hypertext documents may be cached from time to time in the memory 28 and/or mass storage 23 once they are viewed to accelerate subsequent viewing by a user.

It should be appreciated that other software environments may be utilized in the alternative.

Modifying the Relative Alignment of Hypertext Links

As discussed above, the various embodiments of the invention are utilized to modify the relative alignment of selected hypertext links in a document. Modification of the relative alignment is typically performed by adjusting the display position of one or both of a pair of conflicting links. Adjustment of a display position may include any number of manners of shifting the links and/or expanding or compressing the links to modify the extents thereof, including modifying a display characteristic of a link or its surrounding text; expanding, compressing or adding/removing whitespace surrounding a link or its surrounding text; and modifying a display parameter of the window in which the links are displayed, among others. Other manners of adjusting a display position of a link will be apparent to one of ordinary skill in the art.

Figure 3:
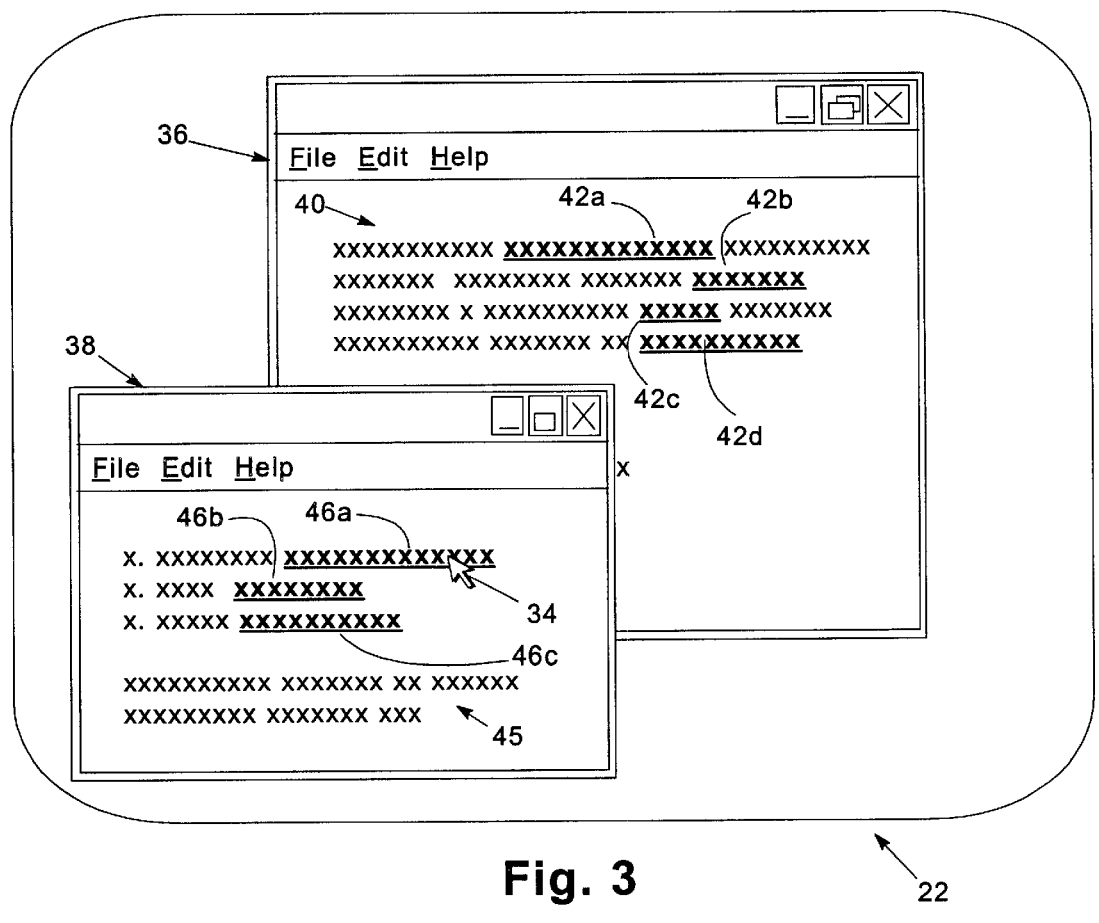
FIG. 3 is a block diagram of a computer display within which is displayed a pair of hypertext documents displayed in separate windows.

As shown in FIG. 3, a document 40 may be displayed in a window 36. In certain instances, a number of the links, e.g. links 42a, 42b, 42c and 42d, may be located in close proximity to one another, and may make it difficult for a user to accurately and efficiently navigate to any specific link due to the risk of an inadvertent selection of an adjacent link. In such instances, the present invention provides a manner for unaligning the links relative to one another so that inadvertent selection of links is minimized.

In a converse situation, illustrated by document 45 in window 38, a number of links, e.g. links 46a, 46b and 46c, may be related with one another (e.g., if the links are used in a table of contents, among other instances). In this later situation, the invention provides a manner of aligning links. This alignment may improve the aesthetic appearance of the document. In addition, by aligning the links with one another, it may be possible to minimize the amount of movement of a pointer 34 when it is desirable to select several of the links within a short time frame.

A principle application of the preferred embodiments of the invention is for use with dynamically-rendered documents such as hypertext markup language (HTML) documents, among other tag-delimited documents, which are rendered "on-the-fly" by a viewer application such as a hypertext browser. It should be appreciated that, for many dynamically-rendered documents, it can be difficult if not impossible for an author of a document to accurately control the precise placement of display objects within the document. For example, text strings (which may or may not include embedded hypertext links) are dynamically wrapped or split into several display lines based upon the current configuration of a user's system. For example, the size of the display window, the margins determined therein, as well as the current font size, style and attributes, may affect precisely where a text string is wrapped, and thus where the hypertext links imbedded therein are positioned within a displayed representation of the document.

For HTML, for example, relatively long text strings are typically defined as paragraphs and delimited by open and closed paragraph tags. For example, the text string "I like to swim but I don't like sharks." (which is used as an example below) might be represented in HTML format with the following text:

"<p>I like to <a href="http:// . . . /About-Swimming.htm">swim</a>but I don't like <a href="http:// . . . /About-Sharks.htm">sharks</a>.</p>"

It can be seen from this code that hypertext links are defined for each of the words "swim" and "shark", so that a user, for example, could access other documents providing background on swimming and sharks, respectively. It should be appreciated that this text string may be wrapped at various points when it is dynamically rendered based upon factors such as the size and style of the font, the size of the window and margins in which the text string is displayed, not to mention other factors that would be apparent to one of ordinary skill in the art. However, while a principle benefit of the preferred embodiments is for use in conjunction with such dynamically-rendered documents, the principles of the invention may also apply to other types of documents, e.g., static documents that are conventionally rendered in an identical fashion on any workstation.

Figure 4:
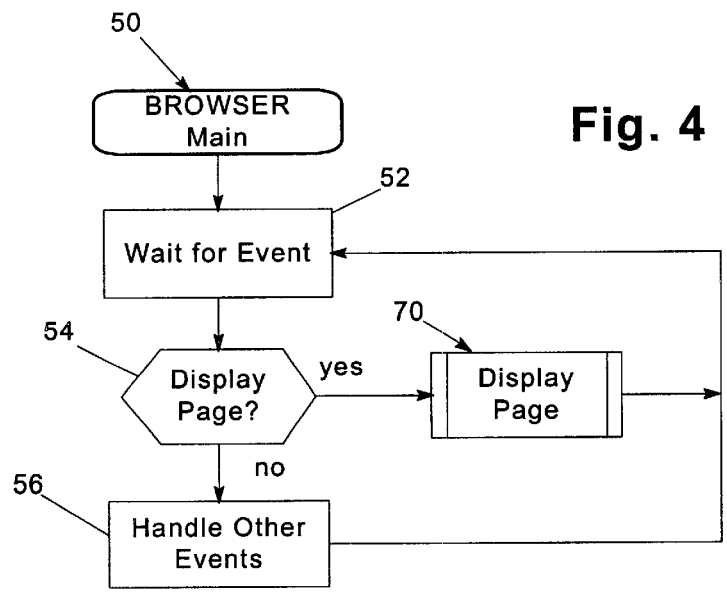
FIG. 4 is a flowchart illustrating the program flow for the main routine of a browser consistent with the invention.

FIG. 4 illustrates the program flow of a main routine 50 for browser 30. Routine 50 is disclosed as an event-driven system, whereby system events are waited for by browser 30 in block 52 and handled as they are received. One such event, a display event, is detected by block 54 and handled by display page routine 70. Other events that are not relevant to the invention are handled in a conventional manner as shown in block 56. It should be appreciated that, in general, other manners of controlling the program flow in an application may be used in the alternative, e.g., procedural-based systems, among others. Therefore, the invention should not be limited solely to event-driven systems.

Figure 5:
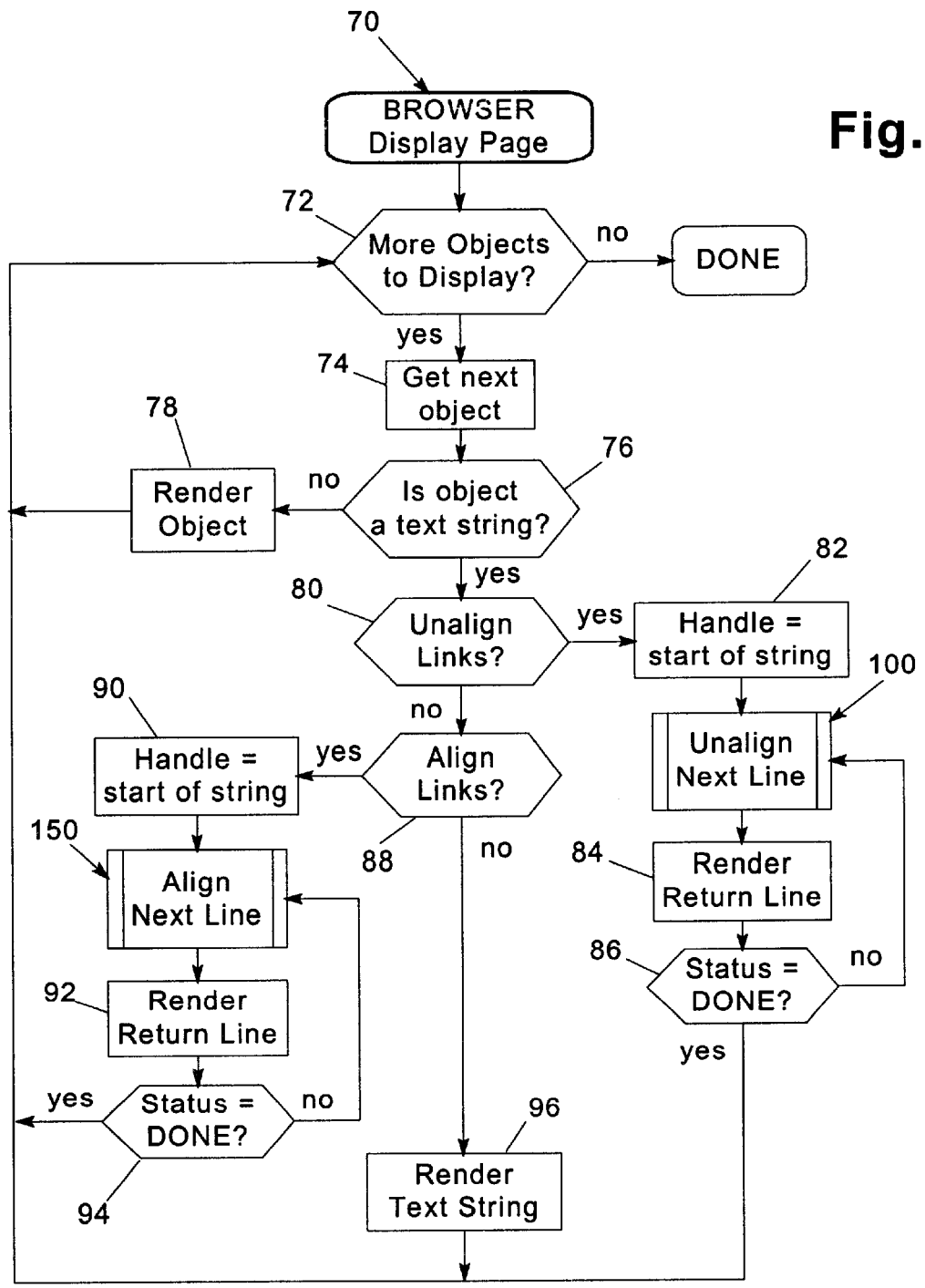
FIG. 5 is a flow chart illustrating the program flow of the display page routine of FIG. 4.

FIG. 5 illustrates display page routine 70 in greater detail. Routine 70 begins in block 72 by determining whether additional objects in the document remain to be displayed. If so, the next object is retrieved at block 74, and block 76 then determines whether the object is a text string. the object is not a text string, the object is rendered in a conventional manner in block 78 and control then returns to block 72 to process additional objects. It should be appreciated that a number of different types of objects may be present in a dynamically-rendered document, e.g., images, background, buttons, controls, animations, videos, audio clips, and executable files, among others.

Returning to block 76, if the object is a text string, control is passed to block 80 to determine whether an "unalign links" flag has been set. If not, control passes to block 88 to determine whether an "align links" flag has also been set. If such a flag has also not been set, control passes to block 96 to render the text string in a conventional manner.

The unalign links and align links flags are selectively set in response to user input as to whether the user wishes to perform unalign or align operations on a document. It should be appreciated that either flag may be set as a default such that all future documents are rendered with an unalignment or alignment operation until the default is changed by a user. The unalign and align links flags may also be set in response to other user input activities, e.g., depressing a tool bar button, selecting a menu item, etc. whereby a document would be redisplayed by calling display page routine 70 in response to the user selection. It should also be appreciated that unalign or align functions may be provided independently of one another, whereby a user's only option would be to enable or disable the particular operation as implemented in his or her system. Other manners of selectively controlling the operation of an unalign and/or align operation may be used consistent with the invention.

Returning to block 80, if the unalign links flag has been set, control is passed to block 82 to set a handle to point to the beginning of the text string. The unalign mechanism discussed hereinafter processes a text string line-by-line with each line that is currently being analyzed compared to the next line thereafter (if any) in the same paragraph to determine if any potential conflicts between links exists.

Consequently, at the initiation of the unalign operation, the start of the string is utilized as the beginning handle from which analysis occurs. Next, an unalign next line routine 100 is called to modify the next display line in the text string if any conflicts are detected. Upon completion of routine 100, the handle is reset to point to the start of the next line (if any) in the text string (as discussed below). Routine 100 also returns a return line string representative of the current line of text being analyzed. As a result, block 84 is executed to render this line on a display.

Routine 100 also returns a status flag indicating whether the end of the text string has been detected and processing of the string is complete. Block 86 therefore is executed to determine whether the returned status flag is set to "done". If additional lines of text in the text string remain to be processed, block 86 again calls routine 100. If all lines in the text string have been processed, however, block 86 returns control to block 72 to process the remaining objects (if any) in the document (e.g., another text paragraph).

Returning to block 88, if an align links flag is set, control is passed to block 90 to perform an align operation in much the same manner as blocks 82-86 discussed above for the unalign operation. Specifically, block 90 sets a handle to the start of the text string. An align next line routine 150 is then sequentially called, with the line returned therefrom rendered in block 92, until a done status is detected by block 94.

Figure 6:
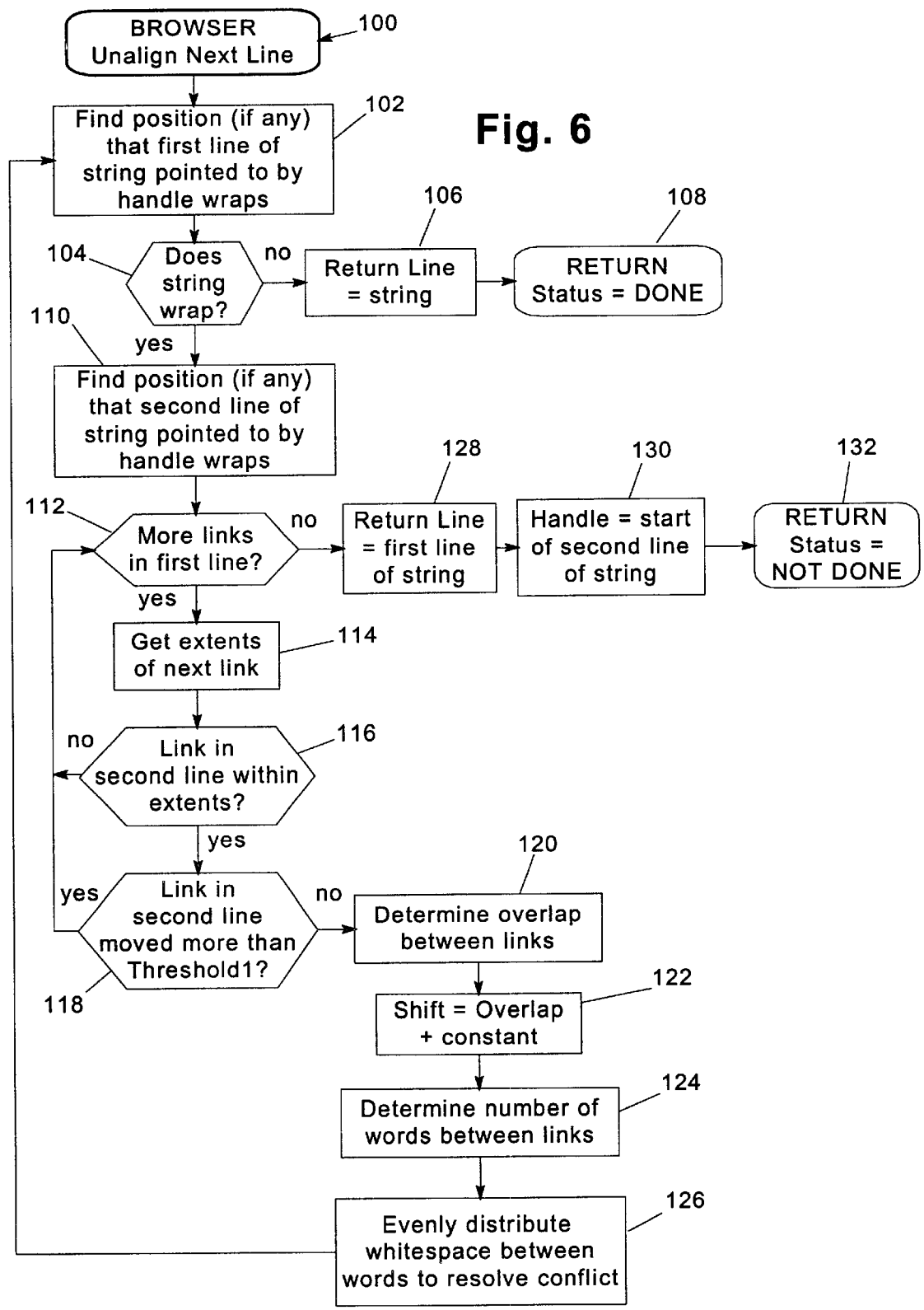
FIG. 6 is a flow chart illustrating the program flow of the unalign next align routine of FIG. 5.

FIG. 6 illustrates unalign next line routine 100 in greater detail. Routine 100 generally operates to add whitespace between a pair of conflicting links to in effect shift a link on a second line to the right a sufficient amount to eliminate any overlaps. Routine 100 begins at block 102 by finding the position (if any) that the first line of the string pointed to by the handle wraps. Determination of the wrap position for a string may be performed in any number of conventional manners, e.g., as used in conventional hypertext browsers.

Next, block 104 determines whether the string wraps. If it does not, the string of text from the position pointed to by the handle and the end of the string is returned in block 106 as the return line for the routine. In addition, routine 100 terminates in block 108 by returning a "done" status.

Returning to block 104, if the string does wrap, block 110 is executed to find the position (if any) that a second line of text in the string wraps, in general the same manner as discussed above with respect to block 102. Consequently, upon completion of block 110, first and second lines of text are defined.

Next, block 112 initiates a loop that processes each hypertext link found in the first line of text. As long as additional unprocessed links exist in the first line, control is passed to block 114 to determine the display position, or extents, of the next link in the first line of text. In this embodiment, the relative alignment of links is controlled via adjusting the horizontal position of one or both conflicting links. Accordingly, the extents of a particular link may be defined in terms of left and right horizontal positions, e.g., in pixels, characters, or other coordinates.

Next, block 116 is executed to determine whether a link in the second line of text falls within the extents of the currently-analyzed link—that is, whether a link in the second line horizontally overlaps the current link.

If not, control is diverted to block 112 to analyze additional links in the first line. If so, however, block 118 is executed to determine whether the link on the second line has been moved more than a first threshold value, which may be empirically determined to limit the amount in which links are manipulated for aesthetic concerns. If the link has been moved more than the threshold, control is diverted to block 112 to process additional links in the first line. If, however, the link has not been moved more than the threshold, control is passed to block 120 to determine the amount of overlap between the links. The overlap is typically measured in units of the current coordinates used to define the positions of the links. For example, for proportional fonts, pixels, points, inches, centimeters or other commonly-used units of measure may be used to define the overlap. For fixed, or non-proportional fonts, spaces may be used. The overlap may also provide a directional indication, e.g., where a positive overlap value represents an overlap where the link on the second line falls predominantly to the right of the current link, with a negative overlap value indicating the link falling predominantly to the left.

Next, block 122 is executed to compute a shift value, which is typically the calculated overlap plus a constant value. For example, it may be desirable to add a degree of whitespace to further separate links horizontally when the links are unaligned. However, the addition of the constant to the overlap value is not required.

Next, block 124 determines the number of words between the conflicting links, and block 26 evenly distributes additional whitespace between such words to resolve the conflict between links. Block 126 may be implemented, for example, by dividing the total shift amount by the number of words and then adding that amount of whitespace between each word. In the alternative, e.g., for non-proportional fonts, it may be desirable to define a predetermined whitespace increment, e.g., a space, and then determine whether the number of words is greater than the number of whitespace units. If so, then predetermined units of whitespace may be evenly proportioned between selected pairs of words to distribute the overlap between the links. If, however, the number of words is less than the number of units, then the number of units to place between each pair of words may be calculated by dividing the total overlap by the number of words. In the alternative, it may be desirable to limit the addition of whitespace to the range between the second link and the start of the second line, since whitespace added to the end of the first line may be discarded via the wrap operation.

Upon completion of the addition of whitespace between the words, control then returns to block 102 to cycle back through the same string to determine if the adjustment has resolved the conflict. If the conflict is resolved, control will flow through blocks 102, 104, 110, and through the loop of blocks 112–118 until no more conflicting links are found, whereby block 112 passes control to 128 to set the first line of the string to the return line. Then, block 130 is executed to set the handle to the start of the second line of the string, prior to returning a not done status in block 132. As a result, block 86 of FIG. 5 will pass control back to routine 100 due to the "not done" status returned thereby, and the next iteration of routine 100 will begin with the next line of text in the text string. Consequently, the loop of blocks 84, 86 and 100 will execute to process each line of text in the string until all conflicts are resolved.

Figure 7:
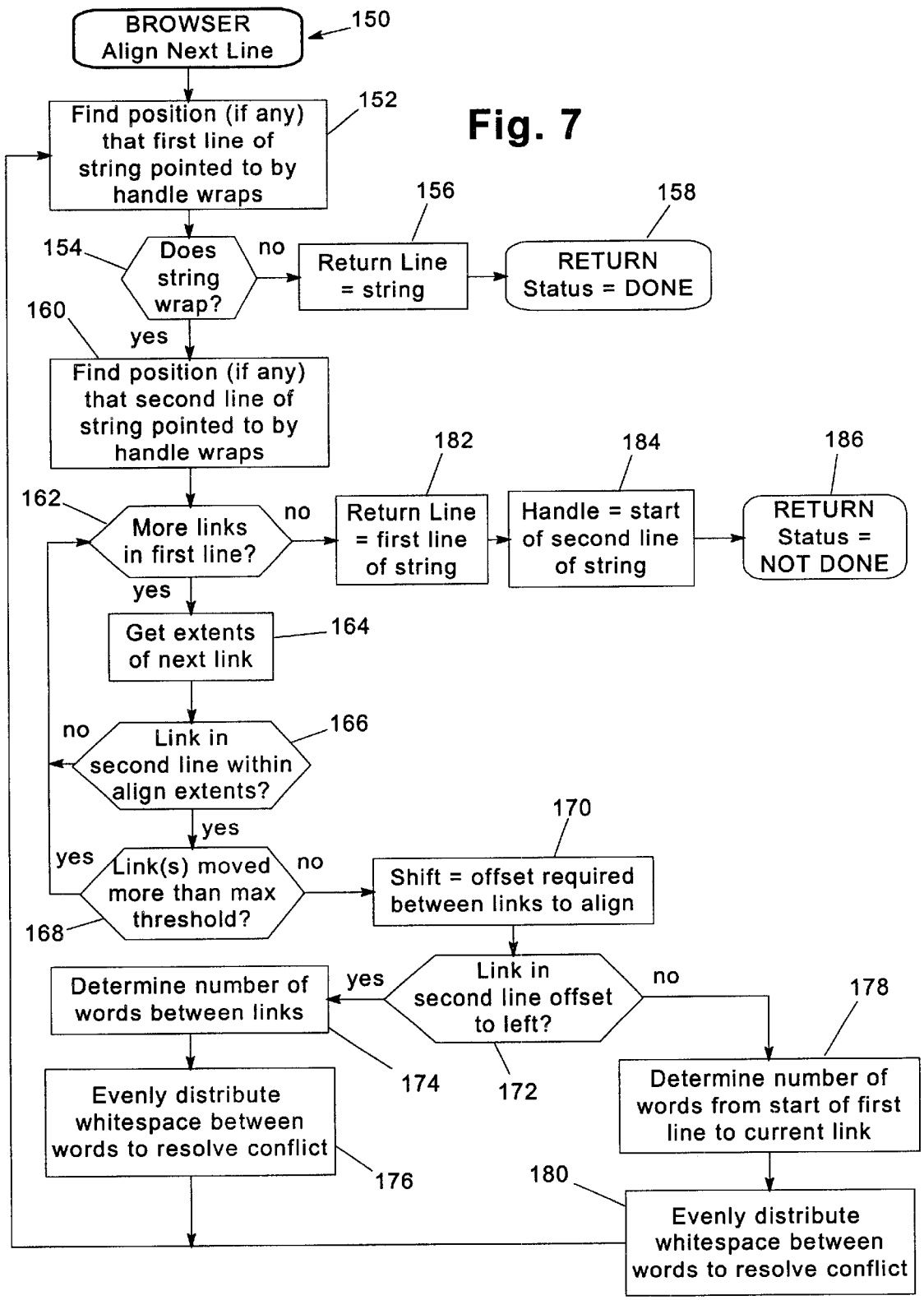
FIG. 7 is a flow chart illustrating the program flow of the align next line routine of FIG. 5.

Align next line routine 150, which is illustrated in greater detail in FIG. 7, operates in a similar manner to routine 100. Specifically, routine 150 begins in block 152 by finding the position (if any) that the first line of the string pointed to by the handle wraps. If the string does not wrap, block 154 passes control to block 156 to return the string as the return line, then to return with "done" status in block 158. Returning to block 154, if the string does wrap, control passes to block 160 to find the position (if any) that the second line of the string pointed to by the handle wraps. Next, block 162 initiates a loop in which each link in the first line is processed. For each such link, block 164 is executed to get the extents of the link. Next, block 166 determines whether a link in the second line of text is within the "align extents" of the current link. The align extents in this context are typically a predetermined range beyond the actual extents of the current link, as it is typically desirable to limit the alignment of links only when such links are within a predetermined maximum distance from one another. In the alternative, the align extents may be coextensive with the actual extents, whereby only links that at least partially overlap would be aligned. Other alternatives will be apparent to one of ordinary skill in the art.

Next, block 168 determines whether either of the conflicting links is moved more than a maximum threshold. If so, further adjustment of the display position of the links is not permitted, and control is passed to block 162 to process additional links in the first line. If not, however, block 170 is executed to calculate a shift value that is equal to the horizontal offset required to align the links with one another. It should be appreciated that the links may be controlled to be aligned through center alignment, right alignment or left alignment, and thus, the shift required to perform this alignment may vary for these different modes. It should also be appreciated that the precise type of alignment between links may be selectively controlled by a user.

Next, block 172 determines whether the conflicting link in the second line of text is offset to the left of the currently-analyzed link. If so, block 174 is executed to determine the number of words between the links. Next, block 176 is executed to evenly distribute whitespace between the words to resolve the conflict—typically by distributing the shift value between the words in a similar manner to block 126 of FIG. 6. Returning to block 172, if the link is not offset to the left, block 178 is executed to determine the number of words from the start of the first line to the current link. Next, block 180 is executed to evenly distribute the whitespace between the words preceding the current link to resolve the conflict. This has the effect of shifting the current link to the right to attempt to align the current link with the link below. Upon completion of either of blocks 176 or 180, control returns to block 152 to reanalzye the current line to determine whether the adjustments made thereto still result in any conflicts.

If all conflicts are resolved, the program flow through routine 150 will eventually be diverted to block 182 such that the first line of the string as adjusted is returned to the calling routine. Next, block 184 sets the handle to the start of the second line of the string such that subsequent calls to routine 150 treat the second line as the new first line of the string. Upon completion of block 184, a "not done" status is returned in block 186, and routine 150 is terminated.

Figure 8:
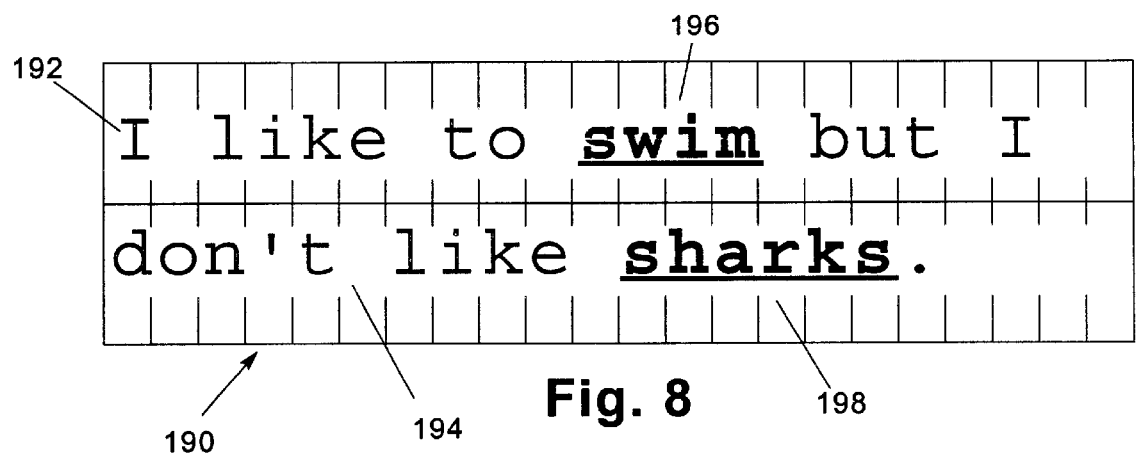
FIG. 8 is a block diagram of an exemplary text string containing hypertext links.

As an example of the alignment and unalignment operations that may be performed consistent with the invention, FIG. 8 illustrates the example text string "I like to swim but I don't like sharks." as rendered into a display representation. To facilitate a better understanding of these operations, text string 190 is rendered in a fixed (non-proportional) font with the lines of text limited to twenty-two horizontal positions. As shown in: FIG. 8, under a conventional rendering process, text string 190 is wrapped after the second occurrence of the word "I" to form first and second lines of text 192, 194. Hypertext links are defined at 196 and 198, and are shown as overlapping by three positions.

Figure 9:
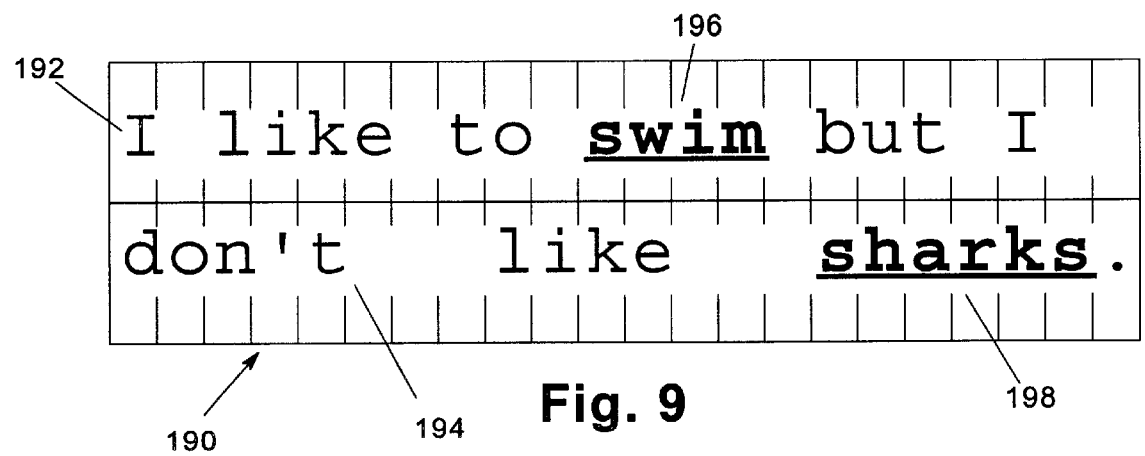
FIG. 9 is a block diagram illustrating the text string of FIG. 8 after an unalign operation.

An unalignment operation performed, for example, by routine 100 of FIG. 6, results in the adjustment of the display positions of links 196 and 198 to the positions shown in FIG. 9. This adjusted representation assumes a total shift value of four spaces with three spaces coming from the calculated overlap, and an additional space being the constant that is added such that the resulting links are horizontally spaced apart by at least one space.

It should be noted that as shown in FIG. 9, the four spaces may be evenly distributed solely on the second line, and specifically between the words "don't", "like" and "sharks". As discussed above, it may be desirable to limit the distribution of whitespace to the second line since in many circumstances the addition of whitespace to the end of the first line will result in a number of such characters being discarded by the wrapping operation for the text string. For example, were spaces to be added between the words "swim" and "but" and/or "I", there would be no resulting shifting of hypertext link 198 since the additional whitespace added to the first line would not affect the start position of the first word on the next line. As another alternative, it may be desirable to calculate the number of blank spaces at the end of the first line and add this total to the shift value such that this unused space is accounted for in the calculation of the number of spaces to distribute between the links. A number of other alternatives, discussed in greater detail below, may also be utilized to ensure adequate separation between the links.

Figure 10:
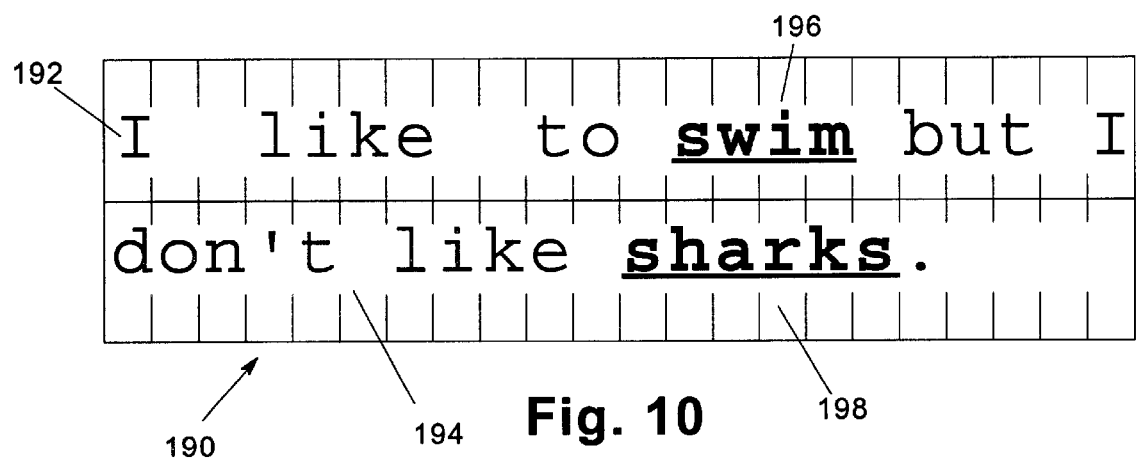
FIG. 10 is a block diagram of the text string of FIG. 8 after an align operation.

FIG. 10 illustrates an alignment operation on the same text string 190 from FIG. 8. In this instance, routine 150 detects an overlap between links 196 and 198, and determines a shift value of two that is required to center align the links with one another. Moreover, given that link 198 is offset to the right of link 196, the program flow of blocks 178 and 180 is executed to evenly distribute two spaces between the start of the first line to the current link, e.g., between the words "I" and "like" and between "like" and "to". As a result, links 196 and 198 are then center aligned with one another as illustrated in FIG. 10.

It should be appreciated that, for example, when a proportional font is utilized, the amount of whitespace added may be a predetermined number of pixels or other units that define the minimum amount of space to add at one position. It should also be appreciated that a wide variety of other manners of modifying the display position of one or both links to either align or unalign such links may be used consistent with the invention.

Figure 11:
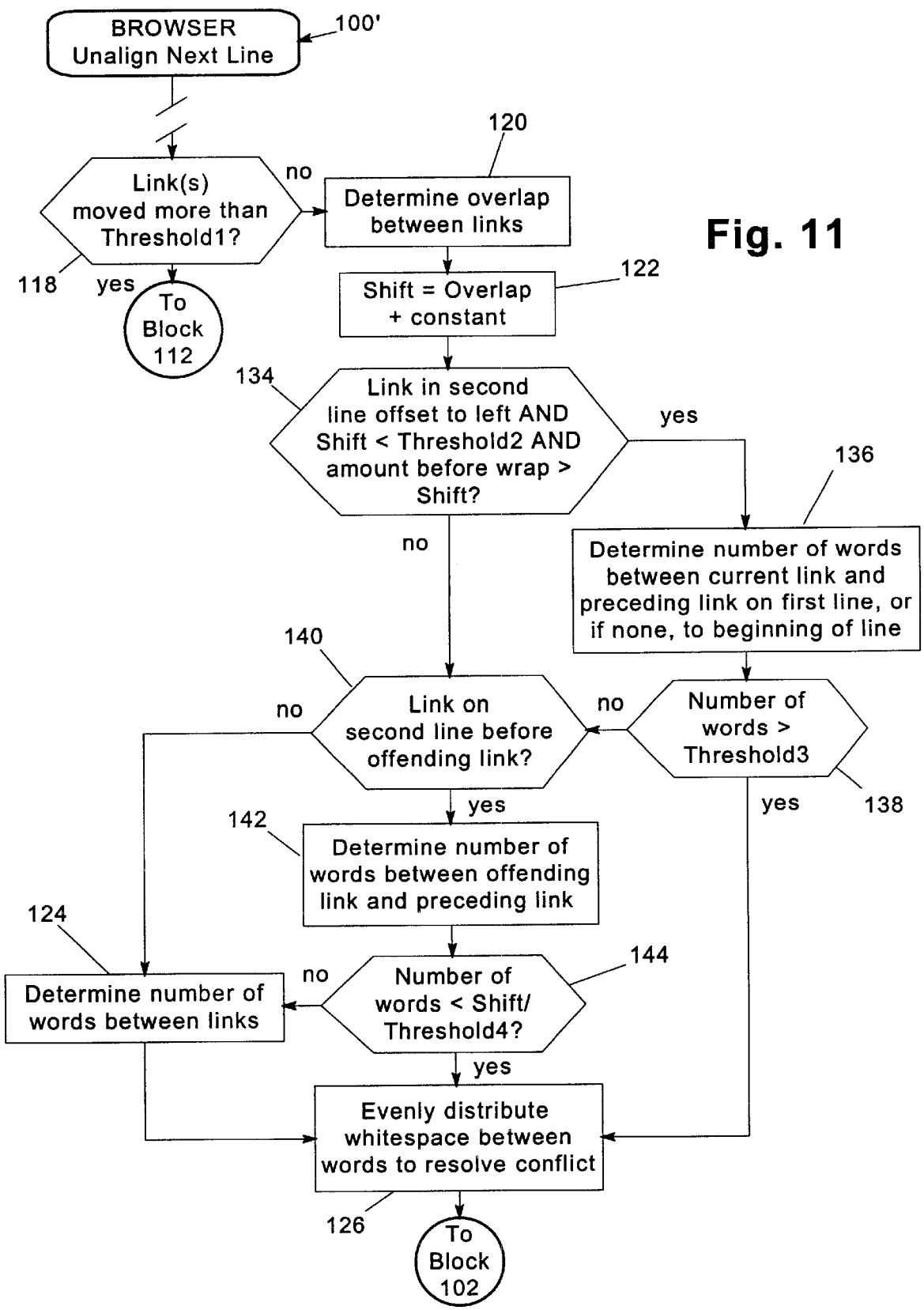
FIG. 11 is a flow chart illustrating the program flow of an alternate unalign next line routine to that illustrated in FIG. 6.
Figure 12:
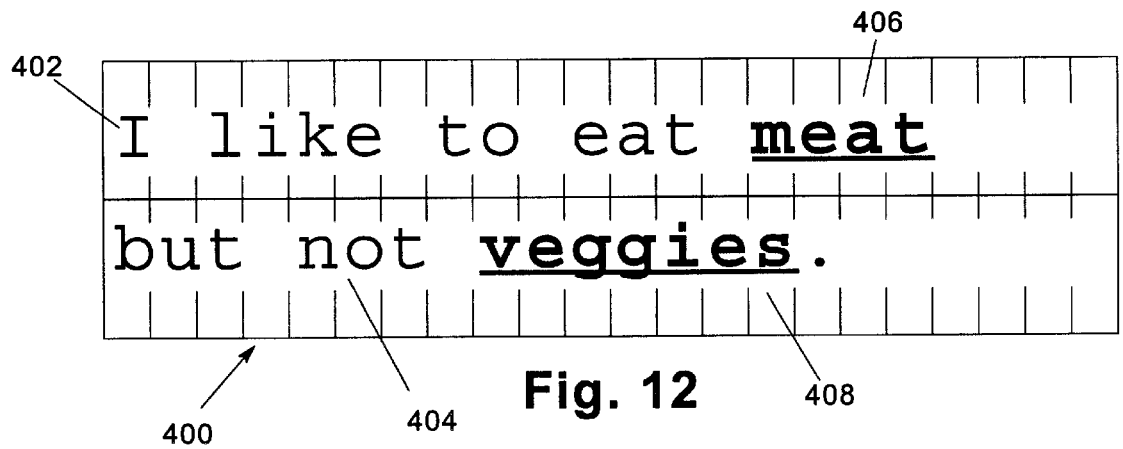
FIG. 12 is a block diagram of another exemplary text string containing hypertext links.
Figure 13:
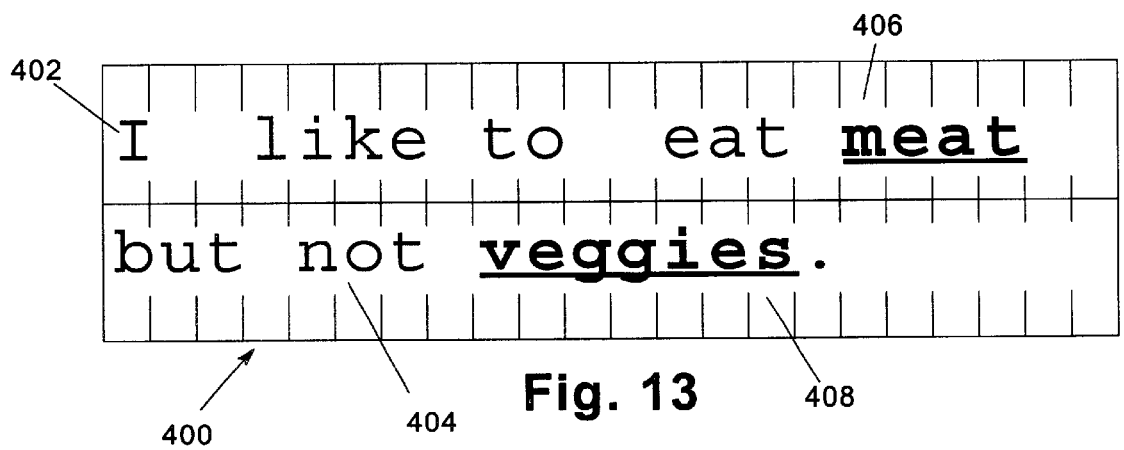
FIG. 13 is a block diagram of the text string of FIG. 12 after an unalign operation.

For example, FIG. 11 illustrates an alternate unalign next line routine 100' that tests for several additional conditions that are not handled by routine 100 described above. As shown in FIG. 11, blocks 118–126 of routine 100 are shown, and operate in the same manner as described above in connection with FIG. 6. However, between blocks 122 and 124 several additional conditions are tested for and separately handled. First, block 134 detects a condition where whitespace exists at the end of the first line where the text string is wrapped. Specifically, block 134 tests for the condition where the link in the second line is offset to the left of the currently analyzed link and where the shift value is less than a predetermined threshold and where the amount of whitespace after the last word in the first line is greater than the shift value, in which event control is diverted to block 136 to determine the number of words between the current link and the preceding link on the first line, or alternatively, if no preceding link exits, between the current link and the beginning of the first line. Next, block 138 is executed to determine whether the number of words calculated in block 136 are greater than a third threshold value. If so, control is passed to block 126 to evenly distribute the whitespace corresponding to the calculated shift value between the words disposed between the current link and either the preceding link on the first line or the beginning of the line if no such preceding links exist. For example, FIG. 12 illustrates an exemplary text string 400 with the text "I like to eat meat but not veggies.", where the words "meat" and "veggies" form hypertext links 406, 408. The text string is wrapped at the word "meat" to form first and second lines 402, 404. In this instance, routine 100' would divert control to block 136 when analyzing hypertext link 406, since link 408 is offset to the left of link 406, the shift value (two spaces) is less than a threshold, and the amount prior to the wrap position (four spaces) is less than the shift amount. In this instance, the number of words preceding link 406 (four) would be found to be greater than a predetermined threshold, and the two spaces comprising the shift value would be evenly distributed therebetween as illustrated in FIG. 13.

Figure 14:
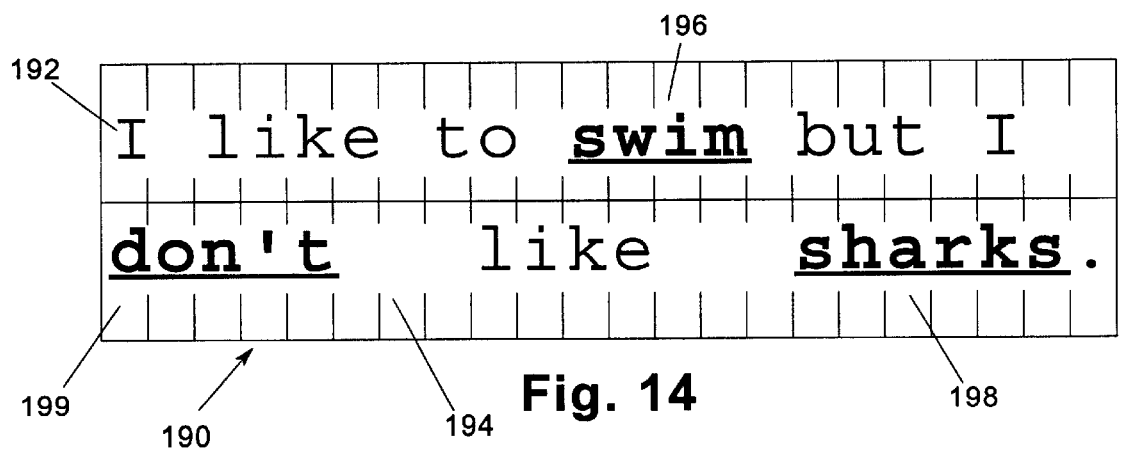
FIG. 14 is a block diagram of the text string of FIG. 8 after an alternate unalign operation.

A second special condition handled by routine 100' is detected at block 140, where it is determined whether a link exists on the second line prior to the link that is causing the conflict with the current link. In such an instance, it may be desirable to inhibit movement of the intermediate link to avoid the creation of any additional conflicts. Thus, if such a link is detected, the number of words determined in block 142 are the words between the offending link and its immediately preceding link. Assuming that the number of words is less than a value equal to the shift value divided by a predetermined threshold, block 144 then passes control to block 126 to evenly distribute the whitespace corresponding to the shift value between the words defined between the offending and preceding links. For example, returning to the initial text string 190 of FIG. 8, FIG. 14 illustrates the situation where the word "don't" also forms a hypertext link 199, such that the whitespace corresponding to the shift value (four spaces) is distributed on each side of the single word between the link 198 that conflicts with link 196, and preceding link 199. As such, two spaces are added before and after the word "like".

With the exception of these two special instances detected in routine 100', processing of other conflicts between links occurs in the same manner as routine 100 of FIG. 6.

Figure 15:
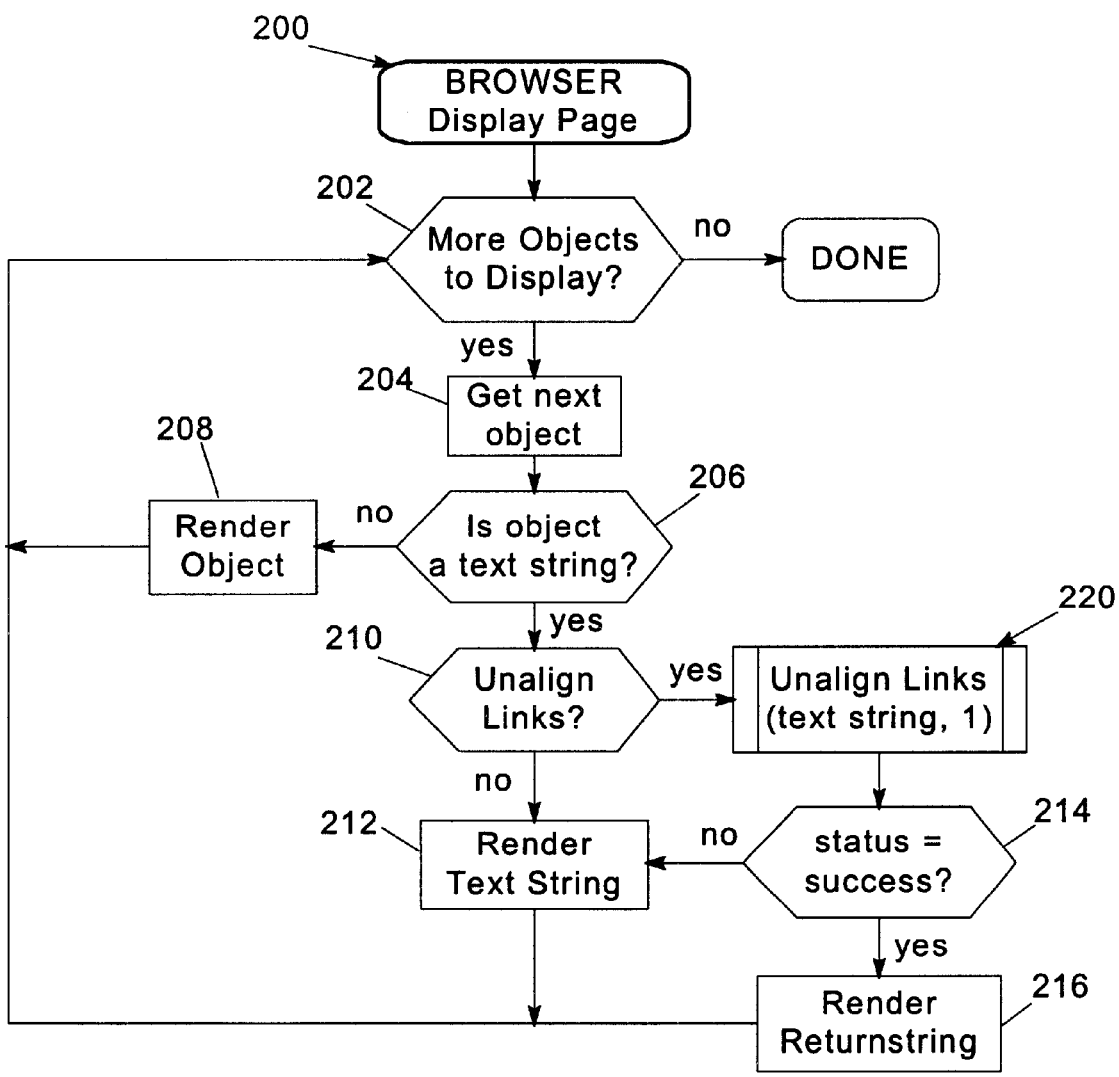
FIG. 15 is a flow chart illustrating the program flow of an alternate display page routine to that of FIG. 5.

As another example, an alternate display page routine 200 is illustrated in greater detail in FIG. 15. Routine 200, rather than processing text strings on a line-by-line basis, processes an entire text string by calling a recursive unalign links routine 220 (discussed below). Routine 200 begins in block 202 by initiating a loop that processes each object in a document for display, and then terminates upon the rendering of each object in the document.

For each such object, block 202 passes control to block 204 to retrieve the next object. Next, block 206 determines whether the object is a text string. If it is not, block 208 is executed to render the object in a conventional manner. If, however, the object is a text string, the unalign links flag is tested in block 210. If the flag is not set, the text string is rendered in a conventional manner in block 212. If, on the other hand, the flag is set, block 210 calls unalign links routine 220, with a first parameter being the text string object to be processed, and a second parameter set to the number of the link to be processed in that string (initially set to one).

Routine 220 returns a status flag and a returnstring variable. Upon completion of the routine, block 214 then determines whether the status returned from the routine indicates success in processing the text string. If so, the returnstring that is returned from routine 220 is rendered in block 216, prior to passing control to block 202 to process additional objects in the display. If the status is not successful, however, control is passed to block 212 to render the original text string without modification.

In this embodiment, only an unalign operation is implemented. It should be appreciated, however, that an alignment operation may also be utilized in this embodiment consistent with the invention.

Figure 16:
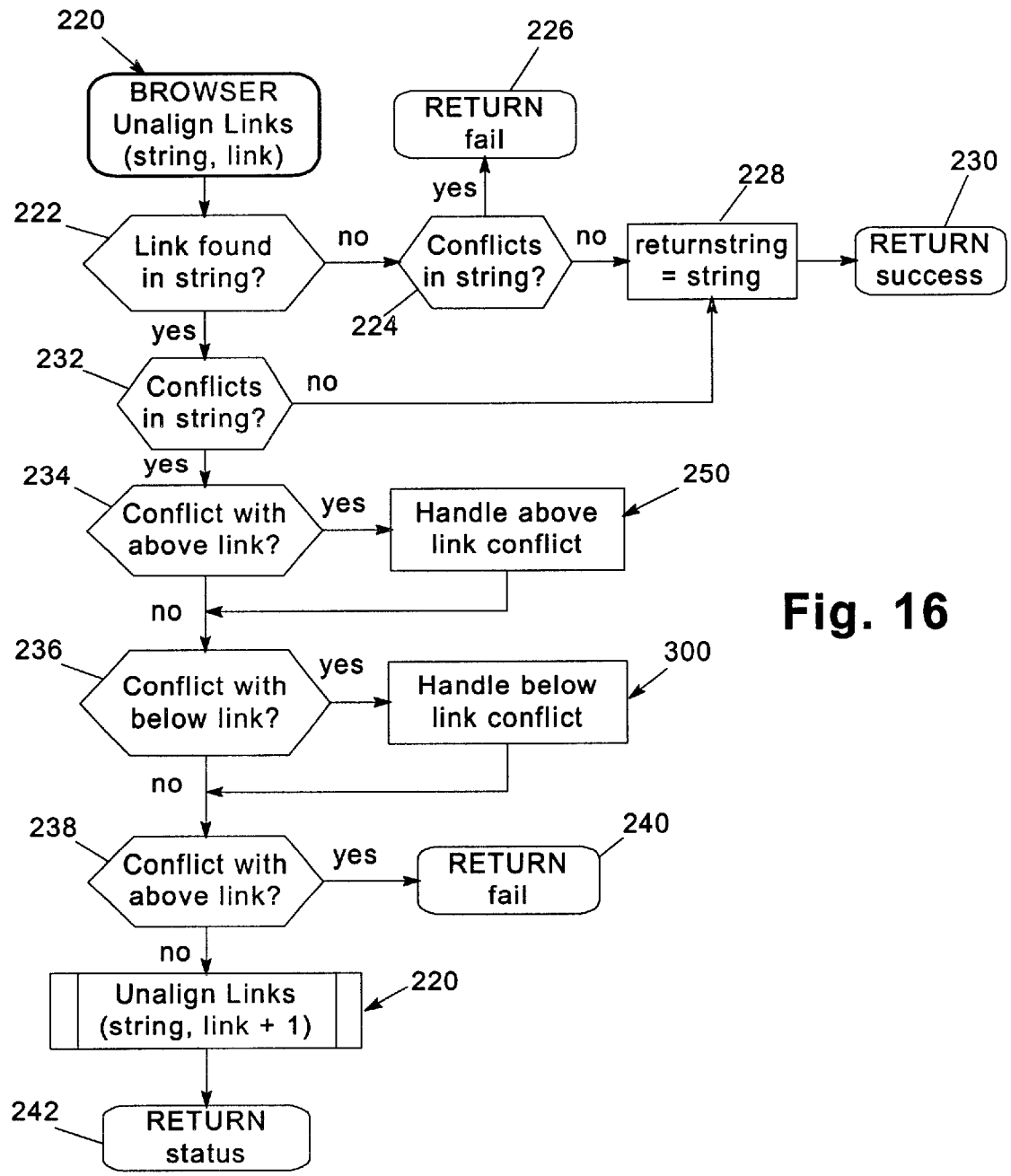
FIG. 16 is a flow chart illustrating the program flow of the unalign links routine of FIG. 15.

Routine 220 is illustrated in greater detail in FIG. 16. The routine generally processes an entire text string using a recursive algorithm. For each link found in the string, conflicts with links located above and below the link are detected and handled in the manner that will described in greater detail below.

Routine 220 begins in block 222 by determining whether the link defined in the function call is found in the input string. If it is not, block 224 is executed to determine whether any conflicts exist in the string—that is, whether any overlap between links on adjacent lines are found in the input string. This operation may be performed, for example, by sequentially scanning through the text string, determining the wrap points therefor, and comparing the extents for each link found therein. If a conflict is detected, control is passed to block 226 to return a "fail" status to the calling routine. If, however, no conflicts are found, the returnstring returned by routine 220 is set to the input string in block 228, and a "success" status is returned in block 230. Returning to block 222, if the link is found in the string, it is next determined whether any conflicts exist in the string in block 232. If no such conflicts exist, control is passed to block 228 to set the input string as the current string and thereafter terminate the routine with a "success" status indicated in block 230.

Returning to block 232, if a conflict is detected in the string, control is passed to block 234 to determine whether a conflict exists between the current link and a link located on an adjacent preceding line. If no such conflict exists, control is passed to block 236. If, however, a conflict is indicated, a handle above link conflict block 250 is executed prior to passing control to block 236.

Block 236 then determines whether a conflict exists with a link on an adjacent succeeding line. If no such conflict exists, control is passed to block 238, and if a conflict is detected, a handle below link conflict block 300 is executed prior to passing control to block 238.

Block 238 then determines whether a conflict now or still exists with a link on an immediately preceding line. Such a condition will exist either if block 250 was unable to handle the conflict in a suitable manner or if the operation of block 300 introduced a new conflict. In any event, should such a conflict occur, control is passed to block 240 to return a "fail" status and terminate the routine. If, however, no conflict is detected in block 238, unalign links routine 220 is recursively called using the same input string and with the link parameter incremented by one until no more links. The status returned from this recursive call is then passed back to the calling routine in block 242, and the routine is then terminated.

FIG. 17 illustrates the program flow of handle above conflict block 250 in greater detail. Routine 250 begins in block 252 by determining whether the link in the above line is offset to the left of the current link. Based upon the results of this query, a pair of blocks 260, 280, are executed in different sequences to attempt to resolve the conflict. If the above link is to the left, block 260 attempts to move the current link to the right, and if necessary, move the above link to the left, to resolve the conflict. Block 280 attempts to move the current link to the left, and if necessary, move the above link to the right, to resolve the conflict. If the above link is not offset to the left of the current link, block 280 is executed prior to block 260. As will become apparent below, each of blocks 260, 280 include a return step that terminates the current instance of routine 220 if no more conflicts are detected within the string. As a result, for example, if block 260 is capable of resolving a conflict when the above link is located to the left, block 280, the current instance of routine 220 is terminated without executing block 280.

The program flow of blocks 260 and 280 is broken out in FIGS. 18 and 19, respectively. As shown in FIG. 18, block 260 begins at block 262 by attempting to move the current link to the right, e.g., by inserting whitespace preceding the link or in other manners discussed herein. Typically, movement of the link is constrained within a predetermined range to minimize the aesthetic effect resulting from the adjustment. If a conflict is still determined between the current and above links, block 264 then passes control to block 266 to attempt to move the above link to the left within a predetermined range, e.g., by compressing or removing whitespace from the text preceding the above link. In either event, control is passed to block 268 to determine whether any additional conflicts exist in the string, e.g., by scanning through the string in the manner discussed above to detect any still-existing conflicts. If no conflicts are detected, control is passed to block 270 to set the returnstring to the current input string. Next, routine 220 is prematurely terminated in block 272 with a "success" status indicated.

Returning to block 268, if additional conflicts are detected in this string, the current input string is temporary held in a local variable localstring in block 274, with this string utilized in a function call to unalign links routine 220 with a link parameter incremented by one. The results of this recursive call are detected in block 276, where if a "success" status is indicated, block 276 passes control to block 272 to return the "success" status and prematurely terminate routine 250. If a "fail" status is detected in block 276, control then proceeds to the next logical block in block 250 (block 280 if the above link was to the left, and block 236 if the above link was to the right).

Block 280 is illustrated in greater detail in FIG. 19. Block 282 initially attempts to move the current link to the left within a predetermined range, e.g., by removing whitespace preceding the link and/or attempting to compress any preceding text. Next, if a conflict is still determined between the current and above links, block 284 diverts control to block 286 to attempt to move the above link right within a predetermined range, e.g., by adding whitespace or expanding the text preceding the above link. In either event, control is then passed to block 288 to determine if any conflicts still remain in the string, in the manner generally described above. If no conflicts are detected, control is passed to block 290 to set the returnstring to the current input string, and then to block 292 to prematurely terminate routine 220 with a "success" status indicated.

Returning to block 288, if additional conflicts exist, control is passed to block 294 to store the current input string in a local variable localstring, then routine 220 is recursively called using the localstring as the input string, and with the link parameter incremented by one to process the next link in the string. The status of this recursive call is then returned and queried in block 296. If a "success" status is indicated, control is diverted to block 292 to return the "success" status and thereby prematurely terminate the current iteration of routine 220. If a "fail" status is detected, execution of routine 220 continues to either block 260 or block 236, depending upon the result of the query in block 252, and thus the context in which the program sequence of block 280 was executed.

Figure 20:
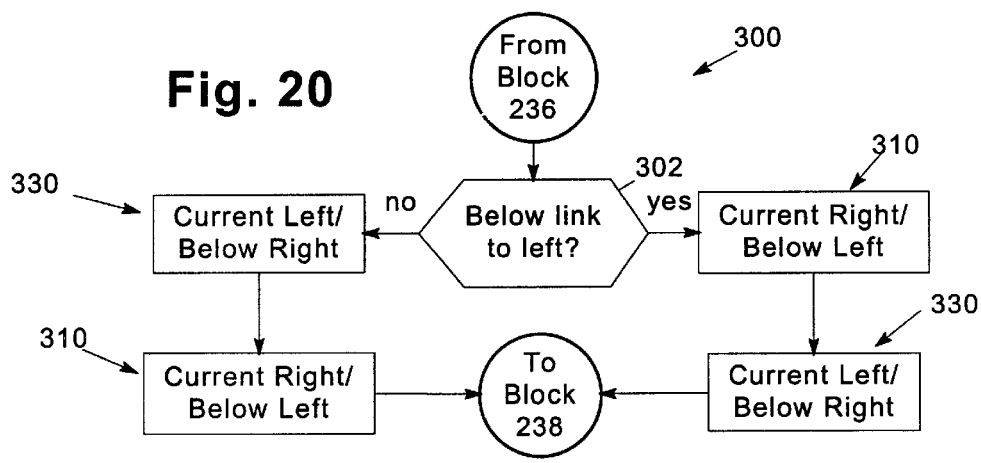
FIG. 20 is a flow chart illustrating the program flow of the handle below link conflict routine of FIG. 16.

The program flow for the handle below link conflict block 300 of FIG. 16 is illustrated in greater detail in FIG. 20. Block 300 generally operates in a similar manner to block 280, where it is determined in block 302 whether the below link is offset to the left of the current link. If it is, a current right/below left block 310 is executed, and if necessary, a current left/below right block 330 is executed prior to returning control to block 238 (FIG. 16). Conversely, if the below link is not offset to the left, block 302 reverses the order in which block 310 and 330 are executed, with block 330 preceding block 310.

Figure 21:
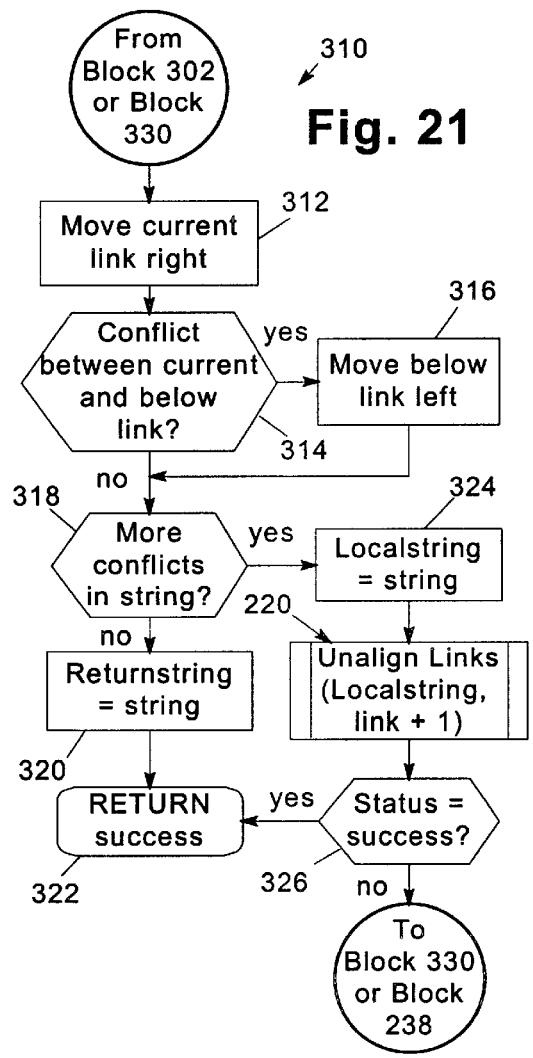
FIG. 21 is a flow chart illustrating the program flow of the current right slash below left routine of FIG. 20.

Block 310 is illustrated in greater detail in FIG. 21. Block 310 operates in a similar manner to block 260 of FIG. 18. Specifically, block 310 first attempts to move the current link to the right within a predetermined range in block 312. Next, it is determined whether a conflict exists between the current and below links in block 314, and if so, block 316 is executed to attempt to move the below link left within a predetermined range to resolve the conflict. In either event, control passes to block 318 to determine if conflicts still exist in this input string. If no such conflicts exist, block 320 sets the returnstring to the current input string, and block 322 prematurely terminates the current iteration of routine 220 with a "success" status indicated. Returning to block 318, if additional conflicts exist, the current input string is stored in a local variable localstring in block 324, and routine 220 is recursively called using the localstring as the input string, and with the link parameter incremented by one. The result of this recursive call is returned and detected in block 326. If a "success" status is indicated, control is passed to block 222 to prematurely terminate the current iteration of routine 220. If not, control is passed to either block 330 or block 238, depending upon the context in which block 310 was called.

Figure 22:
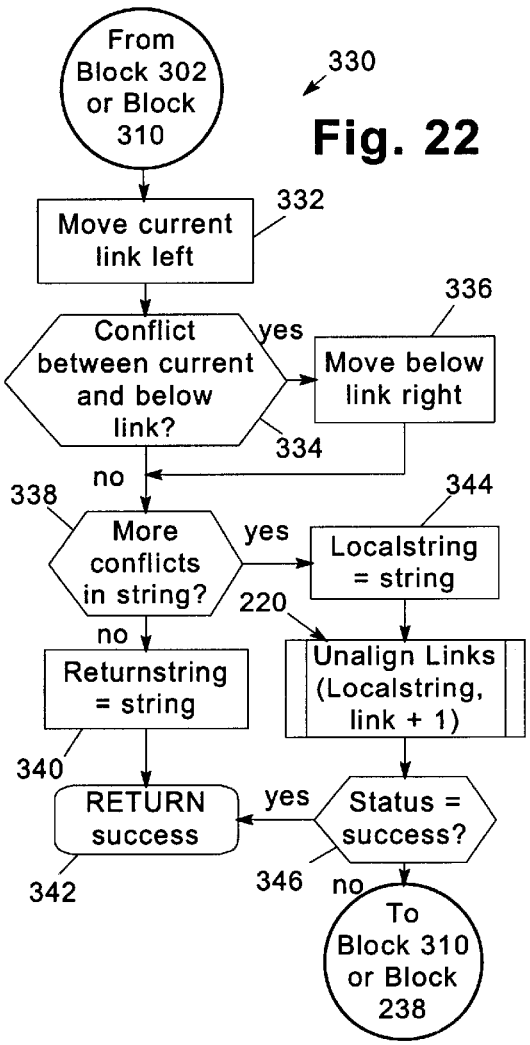
FIG. 22 is a flow chart illustrating the program flow the current left slash below right routine of FIG. 20.

Block 330, which executes in a similar manner to block 280 of FIG. 19, is illustrated in greater detail in FIG. 22. First, block 332 attempts to move the current link to the left within a predetermined range, e.g., by removing whitespace and/or compressing the text preceding the current link. Next, block 334 determines whether a conflict still exists between the current and below link. If so, block 336 is executed to attempt to move the below link to the right within a predetermined range, e.g., by adding whitespace or expanding the text preceding the below link. Next, block 338 determines whether conflicts still exist in the current input string. If no conflicts exist, control is passed to block 340 to set the returnstring to the current input string, and then to block 342 to prematurely terminate the current iteration of routine 220 and return a "success" status. If no conflicts are found, block 344 is executed to store the current input string in a local variable localstring, then routine 220 is recursively called with the localstring as the input string, and with the link parameter incremented by one. The status of this recursive call is then detected in block 346. If a "success" status is returned, control is diverted to block 342 to return this status and prematurely terminate the current iteration of routine 220. If a "fail" status is returned, flow proceeds to either of blocks 310 or 238 depending upon the context in which block 338 was executed.

It should be appreciated therefore, that the recursive algorithm implemented in routine 220 will attempt to pursue various transformations of the original input string and recursively proceed through each link in the string. Should any of the transformations eventually resolve all conflicts, a successful transformation will be returned as the returnstring of the original function call (FIG. 15). If no transformations result in the resolution of all conflicts, then a "fail" status is returned and the original string is rendered.

Figure 23:
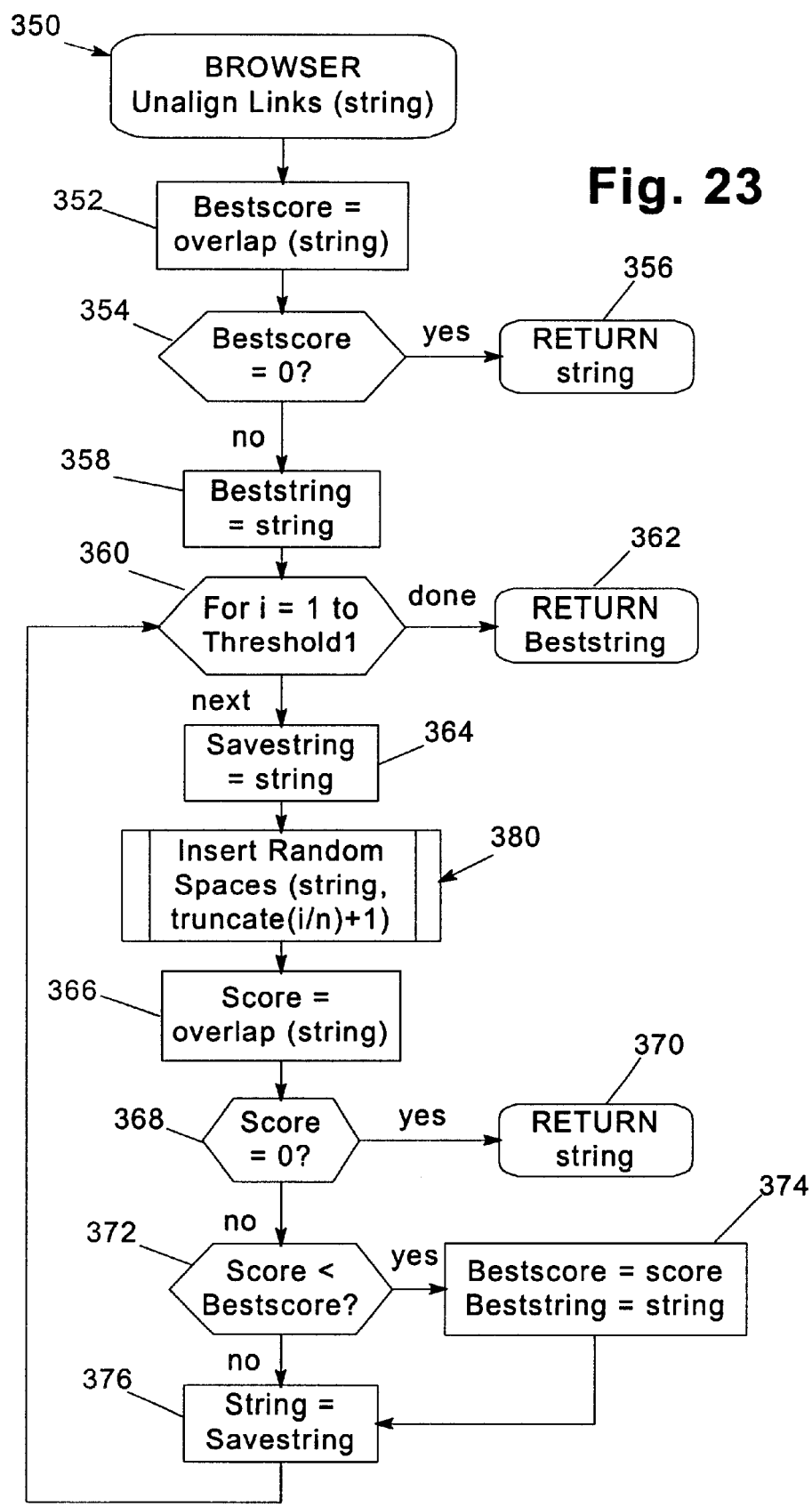
FIG. 23 is a flow chart illustrating the program flow of an alternate unalign links routine to that of FIG. 16.

Yet another manner of implementing an alignment or unalignment operation consistent with the invention is illustrated by unalign links routine 350 of FIG. 23. Routine 350 attempts to insert random whitespace into an input string to test various random combinations and resolve conflicts between links within the string. Routine 350 begins in block 352 by setting a bestscore parameter to the amount of overlap in the input string. The overlap may be calculated, for example, by summing all of the overlap values for any conflicts between links on adjacent lines of the text string. As a result, a lower bestscore value for the string indicates the occurrence of fewer and less severe conflicts.

In fact, a bestscore of zero indicates that no conflicts exist in the string, and thus, block 354 initially tests this condition. If the bestscore parameter is zero, control is diverted to block 356 to return the string (which has been determined to have no conflicts) to the calling routine. If the bestscore is not zero, however, control is passed to block 358 to initially set a beststring variable to the input string.

Next, a for loop is initiated in block 360 to execute a predetermined number of times determined by a first threshold value. The threshold value is set to balance the required bandwidth of the routine with the thoroughness of the unalignment correction. Generally, a larger threshold value will more likely result in a successful unalignment operation at the expense of additional processing. When the for loop initiated in block 360 is complete, control is diverted to block 362 to return the current value stored in the beststring variable to the calling routine and terminate routine 350.

For each iteration of the loop initiated by block 360, block 364 is first executed to temporarily store the string in a savestring variable. Next, an insert random spaces routine 380 is called. A first input parameter to routine 380 is the input string. A second input parameter to routine 380 is the number of spaces to add at random positions within the string. To increase the randomization provided through each iteration through the loop initiated in block 360, the number of spaces to add to the string may be set to be a function of the loop counter (i), e.g., by dividing the loop counter by a constant n (e.g., 5), taking the integer result and adding one. In the alternative, other manners of differentiating the number of spaces through each iteration of the loop may be used. Moreover, a fixed number of spaces may also be utilized through each pass of the loop.

As discussed in greater detail below, routine 380 returns the string as modified with the random spaces added to the string. Block 366 then determines a score for the modified string by determining the sum of the overlaps therein. If this score is zero, block 368 immediately passes control to block 370 to return the modified string to the calling routine, since all conflicts are resolved. If, however, the score is not zero, block 372 is executed to determine whether the score is less than the bestscore value. If so, this indicates that the modified string has less conflicts than the previously-stored beststring. As a result, when the score is less than the bestscore, block 374 is executed to set the bestscore to this score, as well as to set the beststring to the modified string. Next, block 376 is executed to reset the string to its original value as stored in the savestring variable. Control then passes back to block 360 to increment the loop counter and initiate another pass through the loop. As a result, upon completion of routine 350, a best attempt at the unalignment operation is returned to the calling routine.

It should further be appreciated that routine 350 may also be utilized to handle an alignment operation, whereby the determination of a bestscore would be based upon the degree of alignment between the various links in the string. Moreover, the general program flow of routine 350 may also be used with other conflict-resolving algorithms to attempt to find the best solution for an alignment or unalignment operation. For example, instead of calling insert random spaces routine 380, each pass of loop 360 could call an alternate conflict-resolution algorithm to attempt to resolve all conflicts in an alternate manner. Then, the algorithm having the greatest degree of success (indicated by the bestscore) would be utilized to generate the returnstring for routine 350.

The different conflict-resolution algorithms may utilize various techniques for resolving conflicts, such as by modifying a display characteristic of any of the links or surrounding text, e.g., by varying the font type, font size, font attribute (e.g., bold, compressed, expanded, etc.), etc. consistent within limits of tolerance Moreover, different conflict-resolution algorithms may attempt to modify a horizontal extent of a link or the surrounding text, e.g., by expanding or compressing the text, by adding or removing whitespace therefrom, or by modifying the kerning between letters or words. Also, a display parameter for the window within which a string is displayed may be modified, e.g., by adjusting the margins or display size of the window, or in other manners generally known in the art. For example, various justification and "make-it-fit" algorithms are used in various word processors and desktop publishing applications to control the horizontal position of text. Any of these known algorithms may also be used consistent with the invention.

Figure 24:
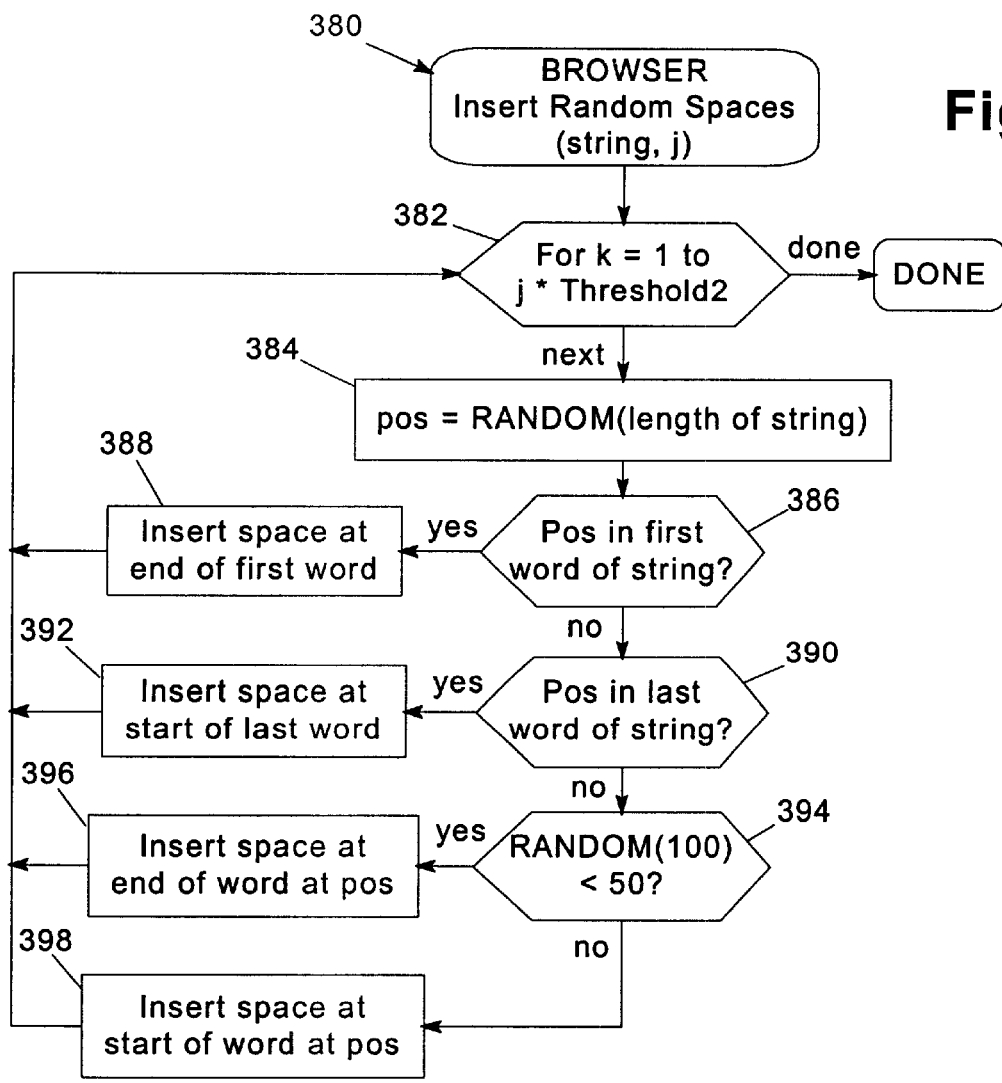
FIG. 24 is a flow chart illustrating the program flow of the insert random spaces routine of FIG. 23.

Insert random space routine 380 is illustrated in greater detail in FIG. 24. Routine 380 begins in block 382 by initiating a for loop that terminates after a predetermined number of passes through the loop. The number of passes determines the number of spaces added to the input string, and may be set by the input parameter as scaled by a threshold value. For each pass through the loop, a position variable pos is calculated in block 384 as a random number between one and the total length of the string to represent a random insertion point in the string. Block 386 next determines whether the insertion point is in the first word of the string. If so, block 388 is executed to insert whitespace at the end of the first word, prior to passing control to block 382 to initiate another pass through the loop. If the insertion point is not in the first word of the string, block 390 is executed to determine whether the insertion point is in the last word of the string. If it is, block 392 is executed to insert whitespace at the start of the last word of the string, prior to returning control to block 382.

If the insertion point is not in the first or last word of the string, block 394 is executed to calculate a random number between one and one hundred, and then determine whether this random number is less than fifty. Depending upon the result of this outcome, either of blocks 396 or 398 is executed to respectively insert whitespace at the end or start of the word encompassing the insertion point. It should be appreciated that block 394 essentially ensures that spaces will be evenly distributed between the start and ends of words over many iterations.

It may be desirable in certain circumstances to include an additional step in routine 380 to improve the overall aesthetic effect of the conflict resolution. Specifically, it may be desirable to determine after calculation of the random pos insertion point whether the number of spaces that have been inserted around the word at the calculated insertion point exceeds a predetermined threshold. If so, it may be desirable to recalculate a new insertion point so that spaces can be added around other words, e.g., by passing control back to block 384. In the alternative, to minimize the risk of this test resulting in an endless loop, control may be passed back to block 382 to restart the for loop for another set of passes through the string.

Various modifications may be made to the preferred embodiments without departing from the spirit and scope of the invention. For example, any number and combination of adjustments may be performed on a text string to either align or unalign links in adjacent lines, including but not limited to adding and/or removing whitespace proximate links or the text surrounding the same, expanding and/or compressing text, modifying a display characteristic such as font size, font type, and/or font attributes, modifying display margins and/or window dimensions, and various combinations thereof. It should also be appreciated that overlapping links may be spaced vertically from one another to minimize inadvertent selection of such links. Moreover, if an unalignment operation is unsuccessful in removing any overlap between links, it may be desirable to expand or compress the text within the actual links such that the selection area for the links are modified to minimize any inadvertent selection of an unintended link. In addition, it may be desirable to simply modify the wrap positions within a text string (analogous to inserting a hard carriage return in the string) to correct any conflicts. Moreover, the analysis of links within a text string may also be expanded to detect conflicts with other display objects adjacent to the displayed representation of the string. For example, it may be desirable to detect and correct for conflicts between links disposed on the first and last lines of adjacent paragraph representations of text strings. Other modifications will be apparent to one of ordinary skill in the art.

Various additional modifications may be made to the above-described embodiments without departing from the spirit and scope of the invention. Therefore, the invention lies solely in the claims hereinafter appended.

What is claimed is:

1. A method of displaying a document on a computer display, the document of the type including first and second hypertext links, the method comprising:

(a) determining display positions for the first and second hypertext links within a displayed representation of the document;

(b) adjusting the display position of at least one of the first and second hypertext links based upon the determined display positions to modify the relative alignment of the first and second hypertext links; and (c) after adjusting the display position, displaying the first and second hypertext links on the computer display at the display positions thereof.

2. The method of claim 1, wherein adjusting the display position is performed in response to detecting a predetermined alignment condition between the first and second hypertext links.

3. The method of claim 2, wherein the predetermined alignment condition is an overlap between the first and second hypertext links, and wherein adjusting the display position includes unaligning the first and second hypertext links to eliminate the overlap therebetween.

4. The method of claim 3, wherein adjusting the display position includes shifting at least one of the first and second hypertext links horizontally.

5. The method of claim 4, wherein adjusting the display position includes spacing the first and second hypertext links horizontally to define a horizontal offset therebetween.

6. The method of claim 2, wherein the predetermined alignment condition is a misalignment of the first and second hypertext links, and wherein adjusting the display position includes aligning the first and second hypertext links.

7. The method of claim 6, wherein adjusting the display position includes shifting at least one of the first and second hypertext links horizontally.

8. The method of claim 7, wherein aligning the first and second hypertext links includes an alignment operation selected from the group consisting of a left alignment, a right alignment, and a center alignment.

9. The method of claim 7, wherein adjusting the display position is performed in response to detection of the second hypertext link having a horizontal position that is within an alignment extent of the first hypertext link.

10. The method of claim 1, wherein the first and second hypertext links are disposed on adjacent lines in the document.

11. The method of claim 1, wherein adjusting the display position includes modifying a display characteristic of at least one of the first and second hypertext links, the display characteristic selected from the group consisting of font type, font size, font attribute, and combinations thereof.

12. The method of claim 1, wherein adjusting the display position includes modifying a horizontal extent of at least one of the first and second hypertext links.

13. The method of claim 1, wherein the first and second hypertext links are defined within a text string, wherein the first and second hypertext links partition the text string into a first substring preceding the first hypertext link, a second substring between the first and second hypertext links and a third substring succeeding the second hypertext link, and wherein the method further comprises displaying the text string on the computer display with the text string wrapped between the first and second hypertext links.

14. The method of claim 13, wherein adjusting the display position includes modifying a display characteristic of at least a portion of one of the first, second and third substrings, the display characteristic selected from the group consisting of font type, font size, font attribute, and combinations thereof.

15. The method of claim 13, wherein adjusting the display position includes modifying a horizontal extent of at least a portion of one of the first, second and third substrings.

16. The method of claim 15, wherein modifying the horizontal extent includes an operation selected from the group consisting of compressing, expanding, kerning, inserting whitespace, removing whitespace, and combinations thereof.

17. The method of claim 13, wherein adjusting the display position includes modifying a position at which the text string is wrapped between the first and second hypertext links.

18. The method of claim 13, further comprising displaying the displayed representation of the document within a window on the computer display, wherein adjusting the display position includes modifying a display parameter of the window.

19. The method of claim 18, wherein modifying the display parameter of the window includes resizing the window.

20. The method of claim 18, wherein modifying the display parameter of the window includes modifying display margins for the window.

21. The method of claim 1, further comprising dynamically rendering the displayed representation from a tag-delimited document.

22. The method of claim 21, wherein the document is a hypertext markup language (HTML) document.

23. A method of displaying a document on a computer display, the document of the type including a plurality of hypertext links, the method comprising:
(a) determining display positions for first and second hypertext links within a displayed representation of the document, the first and second hypertext links disposed on adjacent lines within the displayed representation of the document;
(b) detecting an overlap in horizontal extents of the first and second hypertext links in the displayed representation of the document;
(c) based upon the detected overlap in the horizontal extents of the first and second hypertext links, adjusting the display position of at least one- of the first and second hypertext links to unalign the first and second hypertext links relative to one another to eliminate the overlap therebetween; and
(d) after adjusting the display position, displaying the first and second hypertext links on the computer display at the display positions thereof.

24. A method of displaying a document on a computer display, the document of the type including a plurality of hypertext links, the method comprising:
(a) determining display positions for first and second hypertext links within a displayed representation of the document, the first and second hypertext links disposed on adjacent lines within the displayed representation of the document;
(b) detecting a misalignment between the first and second hypertext links in the displayed representation of the document;
(c) based upon the detected misalignment of the first and second hypertext links, adjusting the display position of at least one of the first and second hypertext links to align the first and second hypertext links relative to one another; and
(d) after adjusting the display position, displaying the first and second hypertext links on the computer display at the display positions thereof.

25. A computer system, comprising:
(a) a computer display; and
(b) a processor, coupled to the computer display, the processor configured to determine display positions for first and second hypertext links within a displayed representation of a document; adjust the display position of at least one of the first and second hypertext links based upon the determined display positions to modify the relative alignment of the first and second hypertext links; and, after adjusting the display position, display the first and second hypertext links on the computer display at the display positions thereof.

26. The computer system of claim 25, wherein the processor is configured to adjust the display position in response to detection of a predetermined alignment condition between the first and second hypertext links.

27. The computer system of claim 26, wherein the predetermined alignment condition is an overlap between the first and second hypertext links, and wherein the processor is configured to unalign the first and second hypertext links relative to one another to eliminate the overlap therebetween.

28. The computer system of claim 26, wherein the predetermined alignment condition is a misalignment of the first and second hypertext links, and wherein the processor is configured to align the first and second hypertext links relative to one another.

29. The computer system of claim 25, wherein the first and second hypertext links are disposed on adjacent lines in the document.

30. The computer system of claim 25, wherein the first and second hypertext links are defined within a text string, wherein the first and second hypertext links partition the text string into a first substring preceding the first hypertext link, a second substring between the first and second hypertext links and a third substring succeeding the second hypertext link, and wherein the processor is configured to adjust the display position by performing an operation selected from the group consisting of modifying a display characteristic of at least one of the first and second hypertext links, modifying a horizontal extent of at least one of the first and second hypertext links, modifying a display characteristic of at least a portion of one of the first, second and third substrings, modifying a horizontal extent of at least a portion of one of the first, second and third substrings, modifying a position at which the text string is wrapped between the first and second hypertext links, and combinations thereof.

31. The computer system of claim 30, wherein each display characteristic is selected from the group consisting of font type, font size, font attribute, and combinations thereof.

32. The computer system of claim 30, wherein each modification to a horizontal extent includes an operation selected from the group consisting of compressing, expanding, kerning, inserting whitespace, removing whitespace, and combinations thereof.

33. The computer system of claim 30, wherein the processor is further configured to display the displayed representation of the document within a window on the computer display, and to adjust the display position by modifying a display parameter of the window, the display parameter selected from the group consisting of resizing the window, modifying display margins for the window, and combinations thereof.

34. The computer system of claim 25, wherein the processor is further configured to dynamically render the displayed representation from a tag-delimited document.

35. A program product, comprising:
  (a) a program configured to perform a method of displaying a document on a computer display, the document of the type including first and second hypertext links, the method comprising:
    (1) determining display positions for the first and second hypertext links within a displayed representation of the document;
    (2) adjusting the display position of at least one of the first and second hypertext links based upon the determined display positions to modify the relative alignment of the first and second hypertext links; and
    (3) after adjusting the display position, displaying the first and second hypertext links on the computer display at the display positions thereof; and
  (b) a signal bearing media bearing the program.

36. The program product of claim 35, wherein the signal bearing media is transmission type media.

37. The program product of claim 35, wherein the signal bearing media is recordable media.

* * * * *